United States Patent
Muquit et al.

(10) Patent No.: US 8,666,121 B2
(45) Date of Patent: Mar. 4, 2014

(54) VEIN AUTHENTICATION DEVICE WHICH VERIFIES A TARGET THAT IS COMPARED TO THE EXTRACTED PIECE OF VEIN INFORMATION OF A FINGER

(75) Inventors: Mohammad Abdul Muquit, Tokyo (JP); Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 12/464,494

(22) Filed: May 12, 2009

(65) Prior Publication Data

US 2009/0285453 A1 Nov. 19, 2009

(30) Foreign Application Priority Data

May 13, 2008 (JP) ................................ P2008-126207

(51) Int. Cl.
*G06K 9/00* (2006.01)
(52) U.S. Cl.
USPC ............................ 382/115; 382/125; 382/128
(58) Field of Classification Search
None
See application file for complete search history.

(56) References Cited

U.S. PATENT DOCUMENTS

| | | | |
|---|---|---|---|
| 2005/0180636 A1* | 8/2005 | Iizuka | 382/217 |
| 2005/0232483 A1* | 10/2005 | Kato et al. | 382/171 |
| 2006/0047970 A1* | 3/2006 | Mochizuki | 713/186 |
| 2007/0177769 A1* | 8/2007 | Motoyama et al. | 382/115 |
| 2007/0230753 A1* | 10/2007 | Kitane et al. | 382/124 |
| 2008/0178002 A1* | 7/2008 | Hirata et al. | 713/168 |
| 2009/0226052 A1* | 9/2009 | Fedele et al. | 382/125 |

FOREIGN PATENT DOCUMENTS

JP    2005-215883    8/2005

* cited by examiner

*Primary Examiner* — Jason M Repko
*Assistant Examiner* — Jhere Rowland
(74) *Attorney, Agent, or Firm* — Finnegan, Henderson, Farabow, Garrett & Dunner, L.L.P.

(57) ABSTRACT

An authentication device includes: a vein information extraction section that extracts a piece of vein information representing a vein from an image containing a vein of a finger; an extraction section that extracts a piece of information representing the position of the finger's outline at an intermediate stage of the process of extracting the piece of vein information; and a determination section that determines, based on the degree of similarity between the piece of information and a piece of information associated with a piece of registration-target vein information, a verification target to be compared with the piece of vein information.

18 Claims, 23 Drawing Sheets

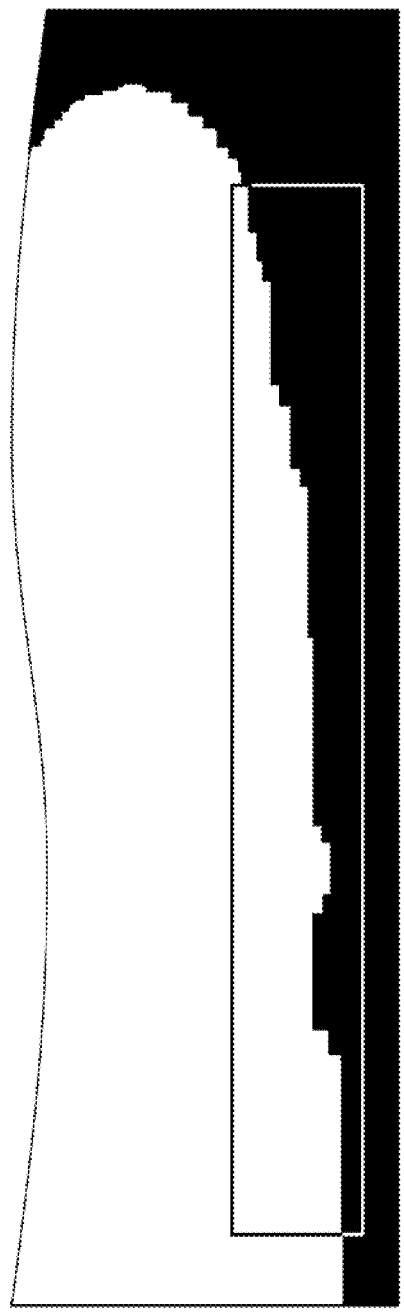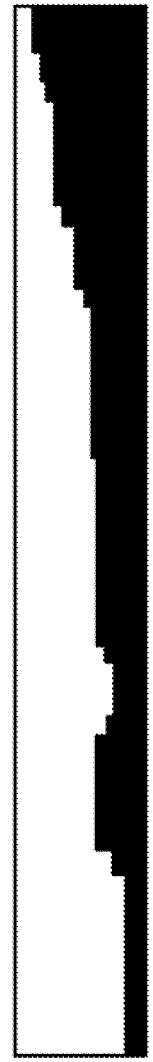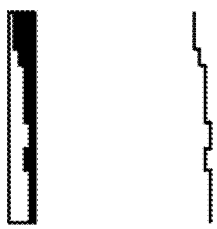
FIG.7C  FIG.7D
FIG.7A    FIG.7B

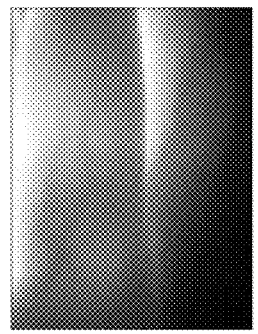  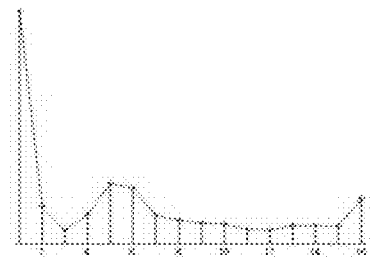
FIG.8A　　　　　　　FIG.8B
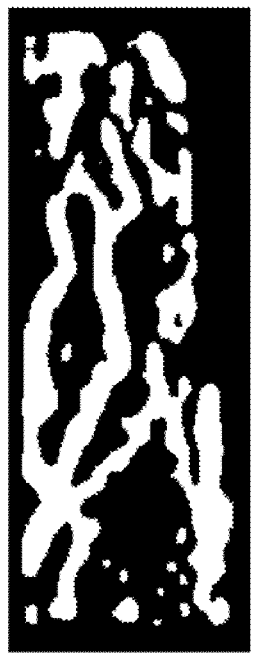 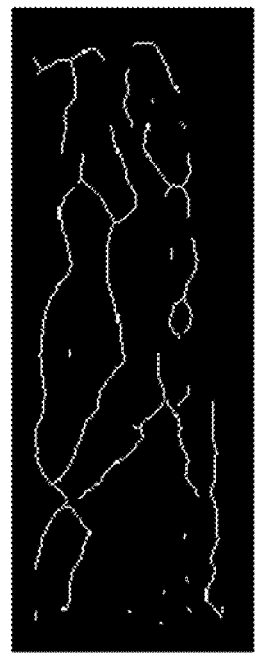
FIG.9A　　　　FIG.9B

VEIN AUTHENTICATION DEVICE WHICH VERIFIES A TARGET THAT IS COMPARED TO THE EXTRACTED PIECE OF VEIN INFORMATION OF A FINGER

BACKGROUND OF THE INVENTION

1. Field of the Invention

The present invention relates to an authentication device, authentication method, registration device and registration method, and is preferably applied to biometrics authentication, for example.

2. Description of the Related Art

There is a case in which a system, such as the one that controls the entering and leaving of people for a certain site, registers registration information about a plurality of people in a memory, and searches the memory when making a determination as to whether the information input by a person corresponds to the registered registration information; and the system then determines whether he is a registered person or not. In such cases, "1:N authentication" is carried out: the input authentication-target information is compared with a plurality of pieces of registration information stored in the memory.

As this type of authentication device, an authentication device that generates low-resolution conversion registration images and low-resolution conversion verification image from a plurality of registration images and an authentication-target verification image, selects a predetermined number of conversion registration images whose correlation with the conversion verification image is strong, and compares the original registration images of the selected conversion registration images with the authentication-target verification image to make a determination as to a person is a registered user or not has been proposed (see Jpn. Pat. Laid-open Publication No. 2005-215883, for example).

SUMMARY OF THE INVENTION

By the way, the above authentication device generates the conversion verification image from the authentication-target verification image. So the authentication device cannot make a determination as to whether he is a registered user or not before the authentication-target verification image is generated. This delays the authentication process.

Moreover, this authentication device performs Hough transform to generate the conversion registration image and the conversion verification image. Hough transform quantizes the linear elements of an image (x-y plane), which has not yet been converted, on a $\rho$-$\theta$ plane.

But, the linear elements to be quantized include not only simple straight lines but also a plurality of line segments on a straight line such as broken lines. This means that the degree of correlation, based on which one registration image is selected to be compared with the authentication-target verification image, could be rough because it also includes the factors not included in the registration images and the verification image; the registration images of the selected conversion registration images therefore may not include his registration image, and this could delay the authentication process.

The present invention has been made in view of the above points and is intended to provide an authentication device, authentication method, registration device and registration method whose authentication process is fast.

In one aspect of the present invention, an authentication device includes: a vein information extraction section that extracts a piece of vein information representing a vein from an image containing a vein of a finger; an extraction section that extracts a piece of information representing the position of the finger's outline at an intermediate stage of the process of extracting the piece of vein information; and a determination section that determines, based on the degree of similarity between the piece of information and a piece of information associated with a piece of registration-target vein information, a verification target to be compared with the piece of vein information.

In another aspect of the present invention, an authentication method includes: a vein information extraction step of extracting a piece of vein information representing a vein from an image containing a vein of a finger; an extraction step of extracting a piece of information representing the position of the finger's outline at an intermediate stage of the process of extracting the piece of vein information; and a determination step of determining, based on the degree of similarity between the piece of information and a piece of information associated with a piece of registration-target vein information, a verification target to be compared with the piece of vein information.

In another aspect of the present invention, a registration device includes: a vein information extraction section that extracts a piece of vein information representing a vein from an image containing a vein of a finger; a key information extraction section that extracts a piece of information representing the state of the finger at an intermediate stage of the process of extracting the piece of vein information as key information of a verification target; and a registration section that associates the piece of vein information and the piece of key information and registers them in a storage section.

In another aspect of the present invention, a registration method includes: a vein information extraction step of extracting a piece of vein information representing a vein from an image containing a vein of a finger; a key information extraction step of extracting a piece of information representing the state of the finger at an intermediate stage of the process of extracting the piece of vein information as key information of a verification target; and a registration step of associating the piece of vein information and the piece of key information and registering them in a storage section.

According to those devices and methods, a verification target is determined based on the position of the finger's outline at an intermediate stage of the process of extracting the piece of vein information. Therefore, the verification target can be determined before completing the extraction of the vein information. Moreover, the determination is made without using pseudo factors such as Hough-transformed images: the determination is accurately made based on factors directly related to a living body. Thus, the authentication device, authentication method, registration device and registration method whose process of authentication is fast can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A to 7D are schematic diagrams illustrating the extraction of the shape of a finger's outline;

FIGS. 8A and 8B are schematic diagrams illustrating the extraction of a brightness histogram;

FIGS. 9A and 9B are schematic diagrams illustrating an image before and after the thinning of veins;

DETAILED DESCRIPTION OF PREFERRED EMBODIMENTS

An embodiment of the present invention will be described in detail with reference to the accompanying drawings.

(1) First Embodiment (1-1) Circuit Configuration of an Authentication Device

Figure 1:
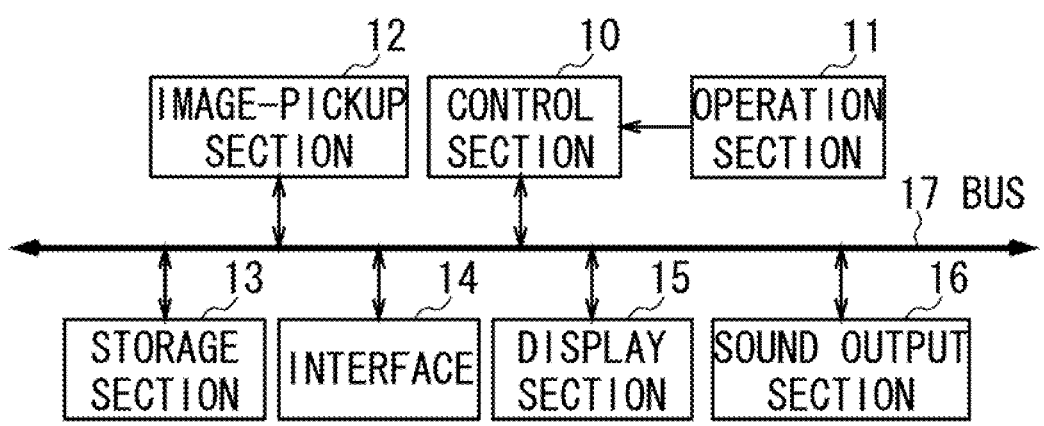
FIG. 1 is a block diagram illustrating the configuration of an authentication device according to an embodiment of the present invention.

FIG. 1 shows the circuit configuration of an authentication device 1 according to a first embodiment of the present invention. The authentication device 1 includes a control section 10 to which an operation section 11, an image-pickup section 12, a storage section 13, an interface 14, a display section 15 and a sound output section 16 are connected via a bus 17.

The control section 10 is a computer including Central Processing Unit (CPU), which takes overall control of the authentication device 1, Read Only Memory (ROM), in which a boot program and other programs are stored, and Random Access Memory (RAM), which serves as a work memory for CPU.

An execution command COM1 and an execution command COM2 are given to the control section 10 from the operation section 11: the execution command COM1 orders the control section 10 to start a vein registration mode in which a registration-target user's vein is registered (this user is also referred to as registrant, hereinafter), while the execution command COM2 orders the control section 10 to start an authentication mode in which a determination is made as to whether a person is a registrant or not.

Based on the execution commands COM1 and COM2, the control section 10 recognizes which mode it should start. And according to a corresponding program, the control section 10 appropriately controls the image-pickup section 12, the storage section 13, the interface 14, the display section 15 and the sound output section 16 to run in vein registration mode or authentication mode.

The image-pickup section 12 includes a beam source that emits a near-infrared beam and gets the beam deeper into a finger put on a beam input surface so that the beam reaches beyond the finger's vein layer: the near-infrared beam with a wavelength range of 700 nm to 900 nm is absorbed by both oxygenated and deoxygenated hemoglobin.

Moreover, the image-pickup section 12 generates an image of the vein inside a part of a living body put on the beam input surface as image data at a predetermined interval (this image is also referred to as vein image, hereinafter), and transmits it to the control section 10.

The storage section 13 stores information about the vein included in the registration-target vein image (the information is also referred to as vein information, hereinafter), and various data such as programs and setting information. Under the control of the control section 10, the storage section 13 stores data or reads out them.

The interface 14 exchanges data with an external device which is connected to it via a predetermined transmission line.

The display section 15 displays characters and figures on a display screen based on display data supplied from the control section 10. The sound output section 16 outputs sound from a speaker based on sound data supplied from the control section 10.

(1-1-1) Vein Registration Mode

The following describes the vein registration mode. After recognizing that it should start the vein registration mode, the control section 10 uses either the display section 15 or the sound output section 16, or both to urge a user to put his finger on the beam input surface. Then, the control section 10 offers the following functions (see FIG. 2): a image-pickup control section 21, a vein information extraction section 22, a key information extraction section 23 and a registration section 24.

The image-pickup control section 21 drives the beam source to emit the near-infrared beam into the finger put on the beam input surface so that the beam reaches beyond the finger's vein layer. The near-infrared beam is reflected and scattered inside the finger, travels through the vein layer and the outer layer of the skin on the way to the beam input surface. The bright part of the near-infrared beam that has reached the beam input surface represents the non-vein portion of the finger; the dark part represents the vein portion of the finger because its hemoglobin has absorbed the beam. The vein portion is in striking contrast to the non-vein portion. Therefore, the near-infrared beam that has returned to an image-pickup surface of the image-pickup section 12 represents the vein (this beam is also referred to as vein representation beam, hereinafter).

Moreover, the image-pickup control section 21 adjusts the position of an optical lens according to the image data output from the image-pickup section 12 so that the vein is in focus. Also, the image-pickup control section 21 adjusts other image-pickup conditions of the image-pickup section 12, such as aperture and the speed of shutter (exposure time), with reference to a predetermined exposure value so that it can appropriately take a picture of the vein of the finger put on the beam input surface.

If it has set the image-pickup conditions of the image-pickup section 12, the image-pickup control section 21 supplies the image data output from the image-pickup section 12 to the vein information extraction section 22.

The vein information extraction section 22 extracts the vein information from the vein image, which is the image data supplied from the image-pickup control section 21 after the image-pickup section 12 took the image.

The key information extraction section 23 obtains an image from the vein information extraction section 22: this image is generated at a predetermined stage of the process of extracting the vein information. The key information extraction section 23 extracts from the image information about the state of the image: the information (also referred to as key information, hereinafter) will be used as a key for a verification target.

The registration section 24 registers the vein information extracted by the vein information extraction section 22 and the key information extracted by the key information extraction section 23 in the storage section 13 after associating them with each other.

In this manner, the control section 10 running in vein registration mode registers in the storage section 13 the vein information, and the key information representing the state of the image at the predetermined stage of the process of extracting the vein information.

(1-1-2) Authentication Mode

The following describes the authentication mode. After recognizing that it should start the authentication mode, the control section 10 uses either the display section 15 or the sound output section 16, or both to urge a user to put his finger on the beam input surface. Then, the control section 10 offers the following functions (see FIG. 3, whose parts have been designated by the same symbols and marks as the corresponding parts of FIG. 2): a image-pickup section 21, a vein information extraction section 22, a key information extraction section 23, a readout section 31, an authentication section 32 and a process execution section 33.

The image-pickup control section 21 drives the near-infrared beam source and sets the image-pickup conditions of the image-pickup section 12. Meanwhile, the vein information extraction section 22 performs the same extraction process as that of the vein registration mode to extract the authentication-target vein information from the image data supplied from the image-pickup section 12 through the image-pickup control section 21.

On the other hand, if the storage section 13 has stored a plurality of pieces of registration-target vein information, the key information extraction section 23 obtains from the vein information extraction section 22 an image that is generated at the same stage of the process of extracting the authentication-target vein information as that of the vein registration mode, and extracts the authentication-target key information from the image by performing the same extraction process as that of the vein registration mode.

If the storage section 13 has stored just one piece of registration-target vein information, the readout section 31 reads out this piece of vein information, and transmits it to the authentication section 32. In this case, the authentication section 32 uses the piece of registration-target vein information, which was read out by the readout section 31 from the storage section 13, and the authentication-target vein information, which was extracted by the vein information extraction section 22 to make a determination as to whether the person is a registrant or not (the success or failure of authentication).

If the storage section 13 has stored a plurality of pieces of registration-target vein information, the readout section 31 reads out from the storage section 13 the pieces of registration-target key information, which have been associated with those pieces of vein information, and transmits them to the authentication section 32. In this case, the authentication section 32 uses the pieces of registration-target key information, which were read out from the storage section 13 by the readout section 31, and the authentication-target key information extracted by the key information extraction section 23 to select, from among a plurality of pieces of vein information registered in the storage section 13, one to be compared with the authentication-target vein information extracted by the vein information extraction section 22.

The authentication 32 lets the readout section 31 read out the selected piece of registration-target vein information as a verification target, and uses this piece of registration-target vein information and the authentication-target vein information extracted by the vein information extraction section 22 to make a determination as to whether the person is a registrant or not (the success or failure of authentication).

If the authentication section 32 determines that he is a registrant (the success of authentication), the process execution section 33 generates control data for starting a predetermined process. The process execution section 33 transmits the control data to an internal or external device connected to the interface 14. This device performs a predetermined process, such as temporarily unlocking a door or lifting limitations on restriction-target operation modes.

If the authentication section 32 determines that he is not a registrant, the process execution section 33 notifies a user of the fact that he is not a registrant by using either the display section 15 or the sound output section 16, or both.

In this manner, if the storage section 13 has stored a plurality of pieces of vein information, the control section 10 running in authentication mode selects the one to be compared with the authentication-target vein information using the pieces of key information representing the states of the image at predetermined stages of the process of extracting the authentication-target vein information and the registration-target vein information.

(1-2) Configuration of the Vein Information Extraction Section

Figure 4:
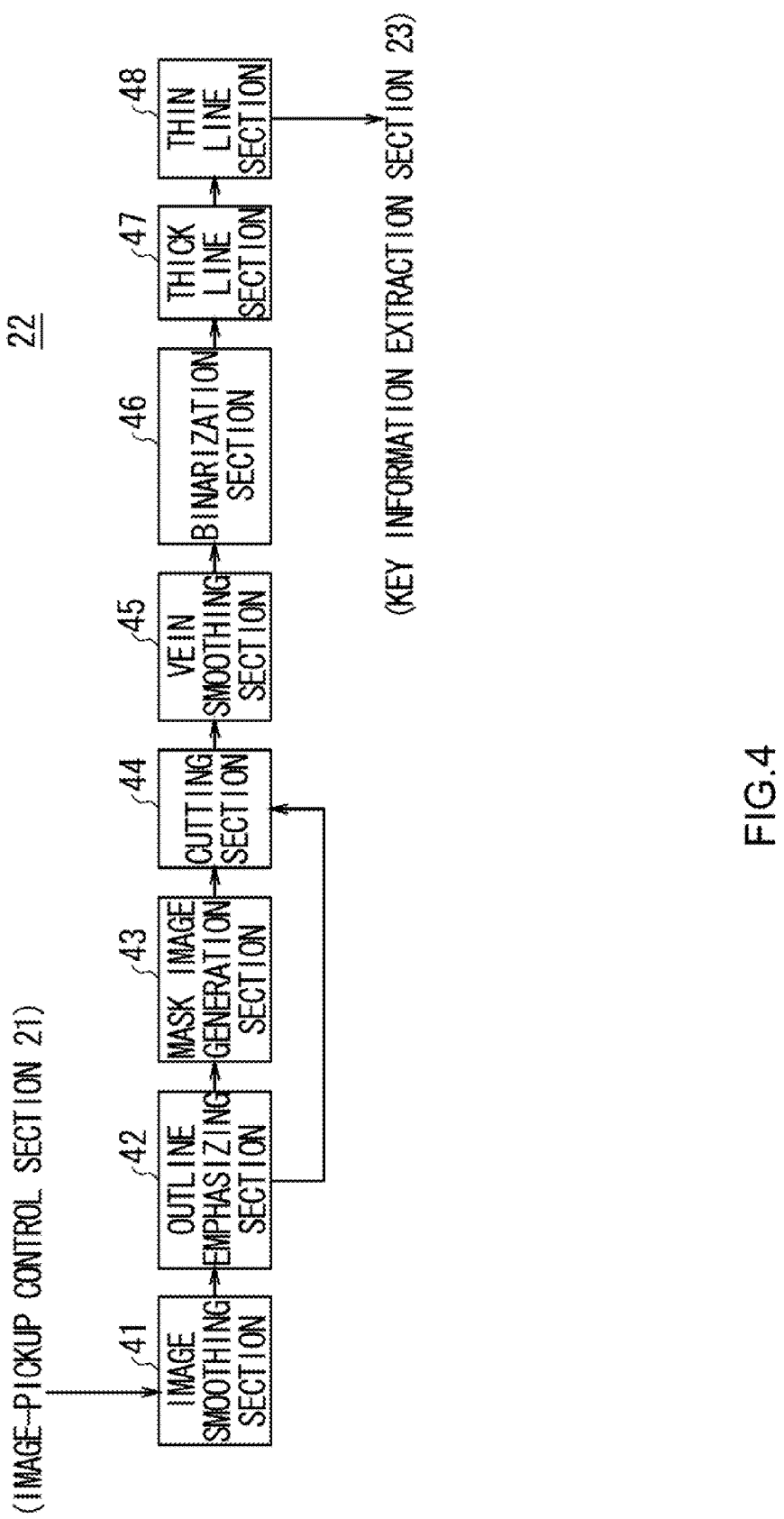
FIG. 4 is a block diagram illustrating the configuration of a vein information extraction section.

The following describes the configuration of the vein information extraction section 22. According to this embodiment, as shown in FIG. 4, the vein information extraction section 22 includes a image smoothing section 41, an outline extraction section 32, a mask image generation section 43, a cutting section 44, a vein smoothing section 45, a binarization section 46, a thick line section 47 and a thin line section 48.

The image smoothing section 41 performs a filtering process for the vein image (or the image data supplied from the image-pickup control section 21 as a result of taking the image) to make it smooth: the filtering process uses a spatial filter called Gaussian, for example.

The outline extraction section 32 performs a filtering process for the vein image supplied from the image smoothing section 41 to raise, or emphasize, its outline: this filtering process uses a spatial filter called Log (Laplacian of Gaussian), for example.

The mask image generation section 43 detects the finger outline from the vein image, in which the outline has been emphasized by the outline extraction section 32, based on the contrast to the background. The mask image generation section 43 then generates a binarized image (also referred to as mask image, hereinafter) in which the area inside the finger outline has been distinguished from the rest.

The cutting section 44 uses the mask image generated by the mask image generation section 43 to cut a predetermined size of area including the area inside the finger outline off the vein image in which the outline has been emphasized by the outline extraction section 32.

The vein smoothing section 45 performs a filtering process for the vein image cut off by the cutting section 44 to make the vein portion of the vein image smooth: this filtering process uses a spatial filter called median filter, for example.

Figure 5:
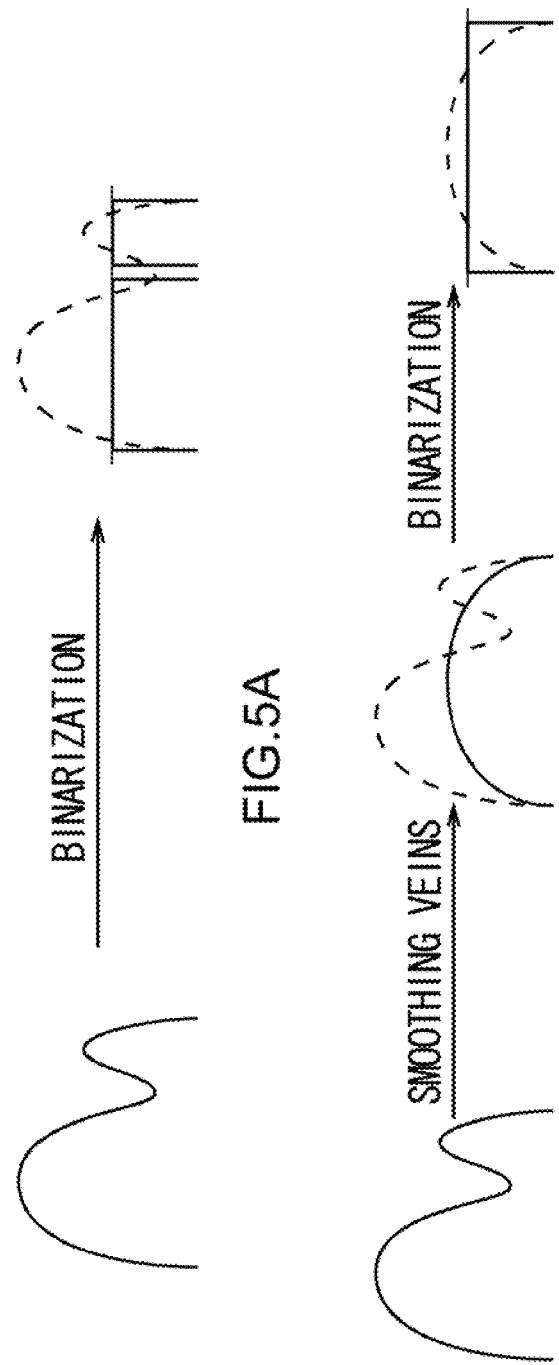
FIGS. 5A and 5B are a schematic diagrams illustrating how the brightness changes during an extraction process of veins.

The binarization section 46 uses a preset brightness level as a point of reference and binarizes the vein image, whose vein portion is made smooth by the vein smoothing section 45. If it binarizes the vein image before its vein portion is made smooth, one vein may be divided into two due to the binarization process (FIG. 5A). By contrast, binarizing the vein image after its vein portion is made smooth produces a vein resembling the real one (FIG. 5B).

The thick line section 47 performs a filtering process for the vein image binarized by the binarization section 46 to make the vein portion of the vein image thick: this filtering process uses a spatial filter called dilation filter, for example. As a result, broken veins are connected together to resemble the original, real vein.

The thin line section 48 performs a filtering process for the vein image, whose vein portion was made thick by the thick line section 47, so that the width of the vein portion is constant: this filtering process uses a spatial filter called erosion.

Accordingly, what the vein information extraction section 22 extracts as the vein information is the binarized image in which the width of vein portion is constant, distinguished from the background.

(1-3) Configuration of the Key Information Extraction Section

Figure 6:
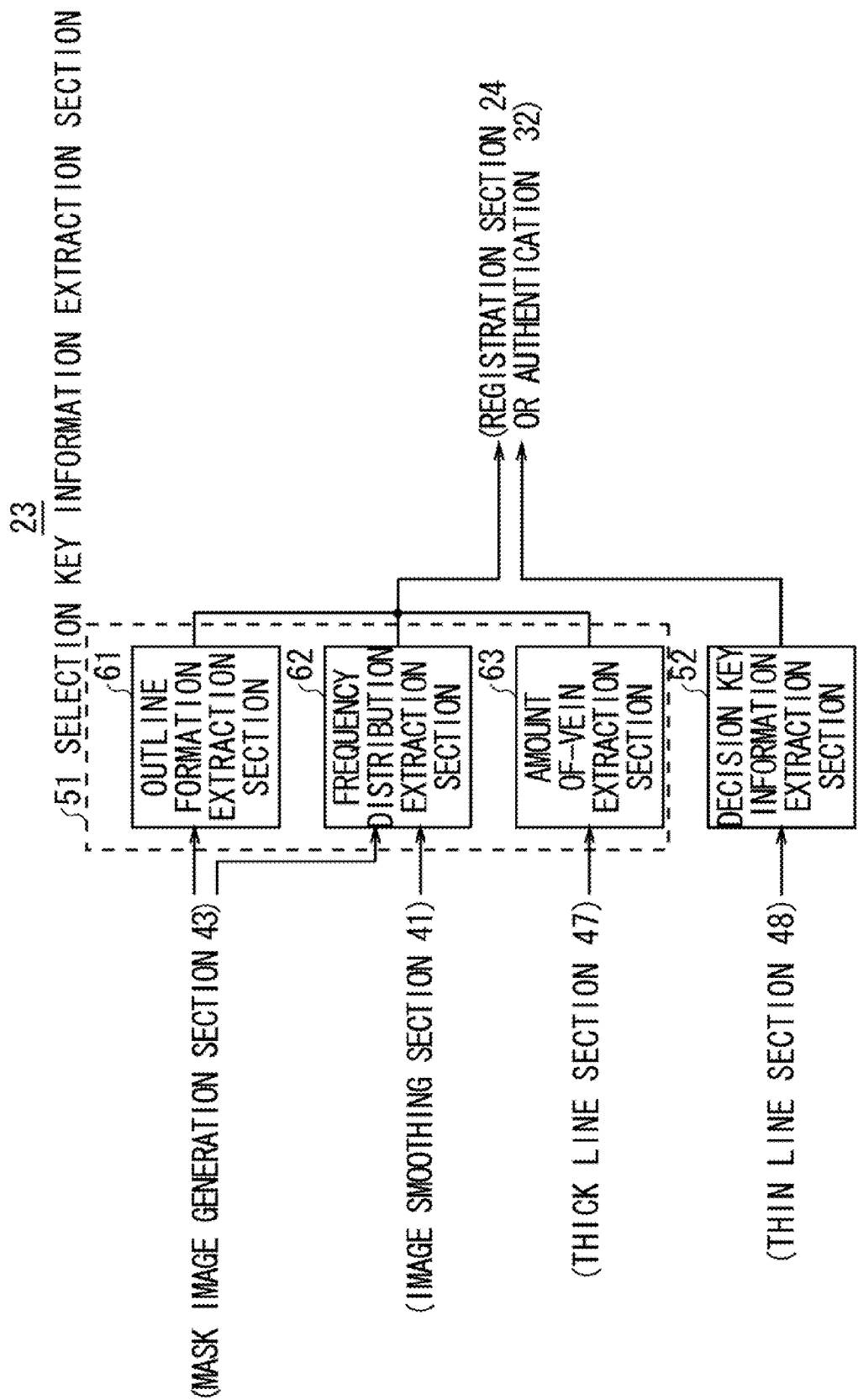
FIG. 6 is a block diagram illustrating the configuration of a key information extraction section.

The following describes the configuration of the key information extraction section 23. As shown in FIG. 6, the key information extraction section 23 includes a selection key information extraction section 51 and a decision key information extraction section 52.

The selection key information extraction section 51 extracts the information representing the state of an image generated at an intermediate stage of the process by the vein information extraction section 22 as a key or selecting a verification target (the information is also referred to as selection key information, hereinafter). The selection key information extraction section 51 includes an outline formation extraction section 61, a frequency distribution extraction section 62, and an amount-of-vein extraction section 63.

The outline formation extraction section 61 extracts the selection key information using the vein image that was generated at a time when noise was being removed from the image. The selection key information represents the shape of the finger's outline.

The following describes a specific example of the extraction method. The outline formation extraction section 61 obtains the mask image from the mask image generation section 43, and cuts a specific area (FIG. 7B) off the mask image (FIG. 7A): this specific area includes a part of the finger's outline (or the pixels corresponding to the finger's frame).

Then, the outline formation extraction section 61 compresses the specific area (FIG. 7B) so that its size becomes 1/n of the original (FIG. 7C), and recognizes the positions of the pixels constituting the finger's frame in the compressed specific area (FIG. 7C) on per row or column basis. The recognized positions are represented by coordinate values (x coordinate values) with respect to the left edge of the specific area (FIG. 7D).

In this manner, the selection key information generated by this extraction method is the coordinate values (x coordinate values) on per row or column basis: the coordinate value represents the distance from a point of reference to the pixel constituting the finger's frame in the specific area. Therefore, the size of data (or the size of the selection key information representing the state (shape) of the finger's outline) is smaller compared with a case in which the selection key information is generated by recognizing the x and y coordinate values of each pixel of the finger's frame.

Incidentally, if "240×30" area is cut off the mask image as the specific area and is compressed so that its size becomes one fifth of the original, the compressed specific area is "48× 6"; the position (or coordinate value) of the finger's outline is therefore "48×1" with respect to the point of reference. Accordingly, the size of the selection key information is 24 byte.

The frequency distribution extraction section 62 extracts the selection key information using the vein image that was generated at a time when noise was being removed from the image: the selection key information represents the frequency distribution of a finger area, the area surrounded by the finger's outline.

The following describes a specific example of this extraction method. The frequency distribution extraction section 62 obtains the vein image from the image smoothing section 41: this vein image was made smooth by the image smoothing section 41. The frequency distribution extraction section 62 also obtains the mask image from the mask image generation section 43.

Then, as shown in FIG. 8, the frequency distribution extraction section 62 recognizes the finger area from the vein image (FIG. 8A) using the mask image, classifies the finger area's pixels into predetermined different brightness groups, and recognizes the number of the pixels in each group (FIG. 8B).

In this manner, the selection key information generated by this extraction method is a brightness histogram of the finger area of the smoothed vein image. Therefore, the size of data (or the size of the selection key information representing the state (shape) of the finger's outline) is smaller compared with a case in which the finger area is regarded as the selection key information. Incidentally, if the brightness classification is 16 bin, the selection key information is 16 byte.

Moreover, in this extraction method, the extraction-target image is the vein image that was made smooth by the image smoothing section 41. Therefore, the selection key information generated by this extraction method distinctively shows the characteristics because the brightness of the finger area is less likely to be changed compared with a case in which the vein image processed not only by the image smoothing section 41 but also by an outline emphasizing section 42 or the vein smoothing section 45 is used as the extraction target.

The amount-of-vein extraction section 63 extracts the selection key information using the vein image generated at a time when the veins of the binarized image were being made thick: this selection key information represents the amount of veins inside the finger area surrounded by the finger's outline. The following describes a specific example of this extraction method. The amount-of-vein extraction section 63 obtains the binarized vein image whose veins were made thick from the thick line section 47, and extracts the selection key information from the vein image: the extracted selection key information shows the number of pixels constituting the veins (the amount of blood vessels).

In this manner, the selection key information generated by this extraction method shows the amount of blood vessels in the binarized vein image whose veins were made thick. Therefore, the size of data (or the size of the selection key information representing the state (shape) of the finger's outline) is smaller compared with a case in which the blood vessels themselves are regarded as the selection key information. Incidentally, the selection key information generated by this extraction method is 2 byte.

Moreover, in this extraction method, the binarized vein image whose veins were made thick is the extraction-target image for the amount of blood vessels. Accordingly, the boundary between the blood-vessel portion and the rest is clearer compared with a case in which the multi-valued vein image is used as the extraction target. This allows the device to detect the amount of blood vessels based on a predetermined reference level. On the other hand, as shown in FIG. 9, the binarized vein image whose veins were made thick (FIG. 9A) represents the state of the blood vessels more precisely than the vein image obtained immediately after the process of thinning the veins in the vein image (FIG. 9B). Therefore, the selection key information generated by this extraction method shows the characteristics distinctively.

The total capacity required to store the selection key information extracted by the above selection key information extraction section 51 is 42 byte (24 byte+16 byte+2 byte). Even if 48 pieces of registration-target vein information are registered, the size of the selection key information stored in the storage section 13 along with the vein information is less than 1 Kbyte. Accordingly, the above method can reduce the size of data (the size of the selection key information) stored in the storage section 13.

The decision key information extraction section 52 extracts, as a key for deciding a verification target, the information representing the state of the vein image generated at a time when the registration-target image is generated by the vein information extraction section 22 (the information is also referred to as decision key information, hereinafter).

The decision key information extraction section 52 obtains the binarized vein image from the thin line section 48: the vein portion, whose width is constant and which is to be regarded as a registration target, is distinguished from the background in this binarized vein image. The decision key information extraction section 52 extracts a compressed image (also referred to as thumbnail image, hereinafter) whose size is 1/n of the original from the vein image as the decision key information.

Accordingly, the decision key information is based on the whole vein image, which is to be regarded as a registration target. Accordingly, this decision key information represents the veins more precisely than the selection key information extracted by the selection key information extraction section 51.

(1-4) Configuration of the Authentication Section

Figure 10:
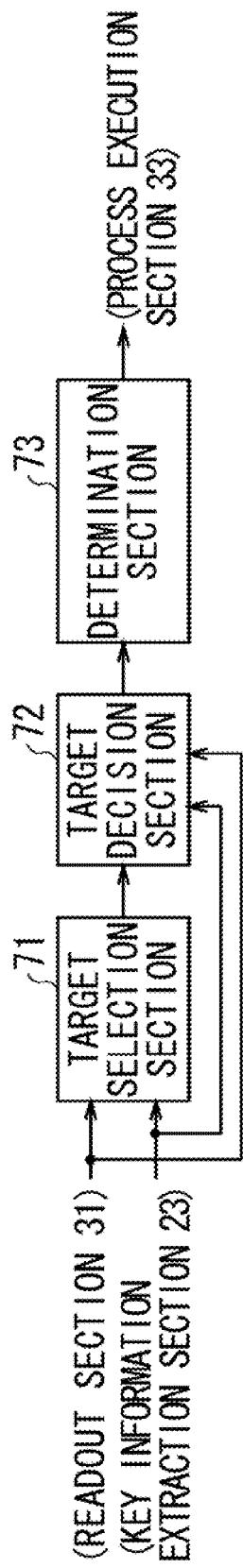
FIG. 10 is a block diagram illustrating the configuration of an authentication section (1)

The following describes the configuration of the authentication section 32. According to this embodiment, as shown in FIG. 10, the authentication section 32 includes a target selection section 71, a target decision section 72, and a determination section 73.

The target selection section 71 compares each element of the registration-target selection key information (the position (coordinate value) of the finger's outline, the number of pixels in each brightness group, and the number of vein pixels) read out from the storage section 13 by the readout section 31 with a corresponding element of the authentication-target selection key information (the coordinate value of the finger's outline, the number of pixels in each brightness group, and the number of vein pixels) extracted by the key information extraction section 23.

The target selection section 71 compares the coordinate values of the finger's outlines: the target selection section 71 calculates the differences between the registration-target selection key information (the coordinate values of the finger's outline) and the authentication-target selection key information (the coordinate values of the finger's outline) on per row (or column) basis and then calculates the total of their absolute values. The smaller the total value, the more the finger's outlines resemble each other. The total value is also referred to as finger outline difference value, hereinafter.

Also, the target selection section 71 made a comparison as to the number of pixels in each brightness group: the target selection section 71 compares the registration-target selection key information (the number of pixels in each brightness group) and the authentication-target selection key information (the number of pixels in each brightness group) extracted by the selection key information extraction section 51. More specifically, the target selection section 71 compares each group of the registration-target selection key information with a corresponding group of the authentication-target selection key information, selects the one having fewer pixels than the other, and calculates the total of the pixels. The larger that total value, the more the brightness states of the finger areas resemble each other. The total value is also referred to as finger area difference value, hereinafter.

Also, the target selection section 71 made a comparison as to the number of vein pixels: the target selection section 71 calculates the difference between the registration-target key information (the number of vein pixels) and the authentication-target selection key information (the number of vein pixels) extracted by the selection key information extraction section 51. The smaller the difference, the more they resemble each other in terms of the occupancy rate of the veins. The calculated difference is also referred to as blood vessel difference value, hereinafter.

After the comparison of the selection key information, the target selection section 71 regards the obtained finger outline difference value, finger area difference value, and blood vessel difference value as S, H, and D, respectively, and a first threshold for the finger outline difference value, and a second threshold for the finger area difference value, and a third threshold for the blood vessel difference value, as T1, T2, and T3, respectively. The ratio ES of the finger outline difference value S to the first threshold T1, the ratio EH of the finger area difference value H to the second threshold T2, and the ratio ED of the blood vessel difference value D to the third threshold T3 are calculated as follows:

$$ES = \frac{S}{T1} \qquad (1)$$

-continued $$EH = \frac{H}{T2}$$

$$ED = \frac{D}{T3}$$

In this manner, the width of the quantity regarding the finger outline difference value, the finger area difference value and the blood vessel difference value is made constant (normalization).

Then, the target selection section 71 calculates an evaluation value E, based on which a verification target is determined:

$$E=ES+ED-EH \qquad (2)$$

In this manner, the target selection section 71 adds the ratio ES of the finger outline difference value S to the first threshold T1 and the ratio ED of the blood vessel difference value D to the third threshold T3 and subtracts from the resultant value the ratio EH of the finger area difference value H to the second threshold T2. According to the evaluation value E, the person is highly likely to be a registrant, as the finger outline difference value S and the blood vessel difference value D become smaller and the finger area difference value H becomes larger.

There is a fourth threshold T4 for the evaluation value E. The target selection section 71 detects a piece of registration-target selection key information whose evaluation value is less than the fourth threshold, and selects a piece of registration-target vein information associated with this piece of selection key information as a verification target, which is to be compared with a piece of authentication-target vein information.

Here, the target selection section 71 compares the number of the selected verification targets with a predetermined number (also referred to as predetermined target number, hereinafter). If the number of the selected verification targets is greater than or equal to the predetermined target number, the target selection section 71 sorts the verification targets in order of ascending evaluation value E.

On the other hand, if the number of the selected verification targets is less than the predetermined target number, there is a possibility that one of the verification targets, or one of the pieces of the registration-target vein information, is exactly or substantially the same as the piece of authentication-target information. In this case, the target selection section 71 selects the verification targets again in order of ascending evaluation value E until the number of the selected verification targets reaches the predetermined target number, and sorts them in a verification order.

In this manner, the target selection section 71 recognizes a degree of similarity (also referred to as similarity value, hereinafter) between a part of the image (the portion of the finger's outline, the portion of the finger area, and the portion of veins) generated at an intermediate stage of the process of extracting the vein information during the registration and a part of the image (the portion of the finger's outline, the portion of the finger area, and the portion of veins) generated at an intermediate stage of the process of extracting the vein information during the authentication in terms of their rough states (shape, brightness state, and the number of vein pixels); selects the pieces of the registration-target vein information as verification targets (i.e. as targets to be compared with the piece of authentication-target vein information) according to the recognized similarity value; and sorts the selected pieces of the registration-target vein information in a verification order (in which the selected pieces of the registration-target vein information will be compared with the piece of authentication-target vein information) according to the recognized similarity value.

If the number of the verification targets is less than the predetermined target number, the target selection section 71 selects and sorts the pieces of the registration-target vein information in order of ascending similarity value, regardless of whether the similarity value of their states (shape, brightness state, and the number of vein pixels) is less than the predetermined level (the fourth threshold). This helps the target selection section 71 to select exactly or substantially the same piece of vein information as the authentication target from the pieces of the registration-target vein information.

Incidentally, for example, the shape of the finger's outline varies according to the degree of curve of the fingertip, the thickness of the finger, and the like. Accordingly, based on the shape of the finger's outline, the target selection section 71 can exclude from the verification targets a piece of registration-target vein information whose finger is completely different from the authentication target in terms of type and age.

Moreover, for example, the brightness state of the finger area varies according to the thickness of the finger, a human race (black, white, or the like) and other factors. Accordingly, based on the brightness state of the finger area, the target selection section 71 can exclude from the verification targets a piece of registration-target vein information whose finger is completely different from the authentication target in terms of type and race.

Furthermore, for example, the amount of blood vessels varies according to the amount of the finger's fat, sex (female or male), the thickness of the finger, or the like. Accordingly, based on the amount of blood vessels, the target selection section 71 can exclude from the verification targets a piece of registration-target vein information whose finger is completely different from the authentication target in terms of type and sex.

Among the verification targets selected more than the predetermined target number by the target selection section 71, the target decision section 72 selects one verification target using the pieces of decision key information (thumbnail images) associated with the verification targets (or the pieces of registration-target vein information) and the piece of authentication-target decision key information (thumbnail image) extracted by the key information extraction section 23.

More specifically, the target decision section 72 lets the readout section 31 read out the pieces of registration-target decision key information (thumbnail images) in an order determined by the target selection section 71; each time one piece of registration-target decision key information (thumbnail image) is read out, the target decision section 72 compares it with the piece of authentication-target decision key information (thumbnail image): the target decision section 72 uses such methods as cross correlation function, phase correlation function or SAD (Sum of Absolute difference) to calculate the degree of similarity (also referred to as similarity value, hereinafter) between the verification-target images (i.e. how much one is different from the other).

If the result of comparing the piece of registration-target decision key information (thumbnail image) with the piece of authentication-target decision key information (thumbnail image) is more than a fifth threshold (which is set for the result of comparison), the target decision section 72 then regards the piece of registration-target vein information associated with this registration-target thumbnail image as a verification target, which will be compared with the piece of authentication-target vein information for verification.

In this manner, the similarity value of the pieces of the decision key information obtained from the result of extracting the vein information during the registration and the authentication represents the states more precisely than that of the selection key information. Using this similarity value, the target decision section 72 selects the piece of registration-target vein information to be compared with the piece of authentication-target vein information for verification.

The determination section 73 compares the piece of registration-target vein information, which was selected by the target decision section 72 as the verification target, with the piece of authentication-target vein information, which was extracted by the vein information extraction section 22 to make a determination as to whether the person is a registrant: the determination section 73 may use the same verification method as the above method for the decision key information (thumbnail image), or it may use a different method.

(1-5) Procedure of an Authentication Process

Figure 11:
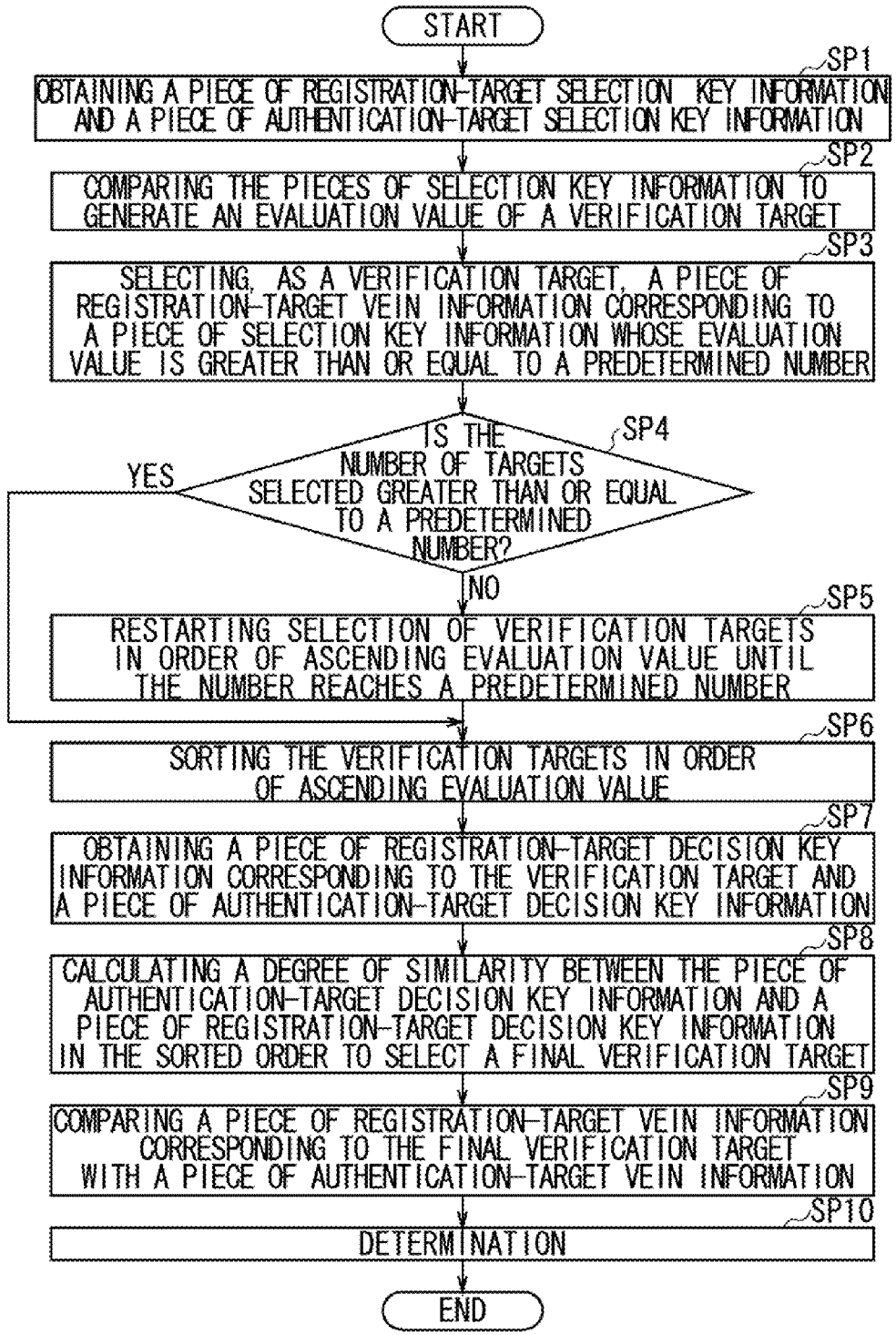
FIG. 11 is a flowchart illustrating the procedure of an authentication process.

The following describes the procedure of an authentication method by the authentication section 32. As shown in FIG. 11, after deciding that it should start the authentication mode, the authentication section 32 starts the procedure of the authentication process. At step SP1, the authentication section 32 obtains a piece of registration-target selection key information and a piece of authentication-target selection key information, and then proceeds to the next step SP2.

At step SP2, the authentication section 32 compares the piece of registration-target selection key information and the piece of authentication-target selection key information to generate an evaluation value: the smaller this evaluation value, the more that piece of registration-target selection key information deserves to be a verification target. The authentication section 32 subsequently proceeds to step SP3.

At step SP3, the authentication section 32 detects the piece of registration-target selection key information whose evaluation value is less than the predetermined value, selects a piece of registration-target vein information associated with this piece of selection key information as a verification target, which is to be compared with a piece of authentication-target vein information, and then proceeds to the next step SP4. At step SP4, the authentication section 32 makes a determination as to whether it has selected them more than the predetermined number (predetermined target number).

If it has selected them more than the predetermined target number, the authentication section 32 assumes that among the selected pieces of registration-target vein information (verification targets), there may be one that is exactly or substantially the same as the piece of authentication-target vein information. In this case, the authentication section 32 proceeds to step SP6 without performing the process of step SP5.

By contrast, if it has not yet selected them more than the predetermined target number, the authentication section 32 assumes that among the selected pieces of registration-target vein information (verification targets), there may not be anything that is exactly or substantially the same as the piece of authentication-target vein information. In this case, the authentication section 32 proceeds to step SP5, restarts the selection process by selecting the pieces of registration-target vein information in order of ascending evaluation value (the evaluation value was generated at step SP2) as verification targets, and then proceeds to step SP6.

At step SP6, the authentication section 32 sorts the selected verification targets in order of ascending evaluation value (the evaluation value was generated at step SP2), which is a verification order, and then proceeds to the next step SP7. At step SP7, the authentication section 32 obtains the pieces of decision key information associated with the verification targets (i.e. the pieces of registration-target vein information) and the piece of authentication-target decision key information.

Then, the authentication section 32 proceeds to step SP8, and compares each piece of registration-target decision key information with the piece of authentication-target decision key information in a verification order determined by the process of step SP6 to find out the piece of registration-target information whose similarity value with respect to the piece of authentication-target decision key information is greater than or equal to the predetermined value. The authentication section 32 then regards the piece of registration-target vein information associated with this piece of registration-target decision key information as a verification target.

The authentication section 32 subsequently proceeds to step SP9, compares the verification target, or the piece of registration-target vein information, with the piece of authentication-target vein information, and then proceeds to the next step SP10. At step SP10, based on the result of comparison, the authentication section 32 makes a determination as to whether the person is a registrant, and then ends the procedure of the authentication process.

In this manner, the authentication section 32 roughly selects the verification targets using the pieces of selection key information, and then excludes inappropriate verification targets from them using the pieces of decision key information, which more accurately represent the states than the selection key information.

(1-6) Operation and Effect

With the above configuration, the authentication device 1 extracts a piece of key information representing the position of the finger's outline at an intermediate stage of the extraction process in which a piece of registration-target vein information is extracted, associates it with the piece of vein information, and stores them in the storage section 31.

Meanwhile, the authentication device 1 extracts a piece of information representing the position of the finger's outline at an intermediate stage of the extraction process in which a piece of authentication-target vein information is extracted, and selects, from among the pieces of registration-target vein information, a verification target to be compared with the piece of authentication-target vein information, based on the degree of similarity between that piece of information and the piece of key information registered in the storage section 13.

In this manner, the position of the finger's outline during the extraction process of the vein information is important in determining the verification target. This allows the authentication device 1 to determine the verification target during the extraction process of the authentication-target vein information, thereby increasing the speed of the authentication process. Moreover, the positional information of the finger's outline is directly related to the living body, and does not include any pseudo factors such as those included in Hough-transformed images. Accordingly, the verification targets are more likely to contain the registrant's registration image than when using those including the pseudo factors. As a result, the speed of this authentication process is fast.

Moreover, the authentication device 1 recognizes the position of the finger's outline in the following manner: the authentication device 1 recognizes, at a predetermined interval, the positions of the pixels constituting the finger's frame in a predetermined area of an image generated at an intermediate stage of the extraction process of the vein information (FIG. 7C).

Accordingly, the amount of information produced by the authentication device 1 to represent the shape of the outline is smaller than when all the pixels constituting the finger's frame are used (FIG. 7B). This reduces the amount of data stored in the storage section 13 and also reduces processing load during the process of calculating the similarity value regarding the information of the positions of the finger's outline.

Moreover, in this authentication device 1, the positions of the pixels, which were detected at a predetermined interval, are expressed by a coordinate value (x coordinate value) representing the distance from the point of reference in the predetermined area (i.e. from the left edge), not x and y coordinate values (FIG. 7D) Accordingly, the amount of information generated by the authentication device 1 to represent the shape of the outline becomes much smaller.

Moreover, in this authentication device 1, the image from which the information about the position of the finger's outline is extracted is the image generated by the image smoothing section 41 during the process of removing noise from the image containing the veins of the finger. In this manner, the authentication device 1 precisely extracts the portion of the finger's outline from the image from which the pseudo factors, such as those caused by transitory factors (including image-pickup conditions), have been removed. Accordingly, the verification targets are more likely to contain the registrant's registration image than when not using that image.

Moreover, the authentication device 1 extracts not only the information about the finger's outline but also the information about the frequency distribution of the area surrounded by the finger's outline and the information about the amount of veins in the area surrounded by the finger's outline. Accordingly, the authentication device 1 can recognizes the characteristics of the living body from various viewpoints. Accordingly, the verification targets are more likely to contain the registrant's registration image than when only the information about the finger's outline is used, even if the authentication device 1 reduces the amount of each type of information.

Figure 12A:
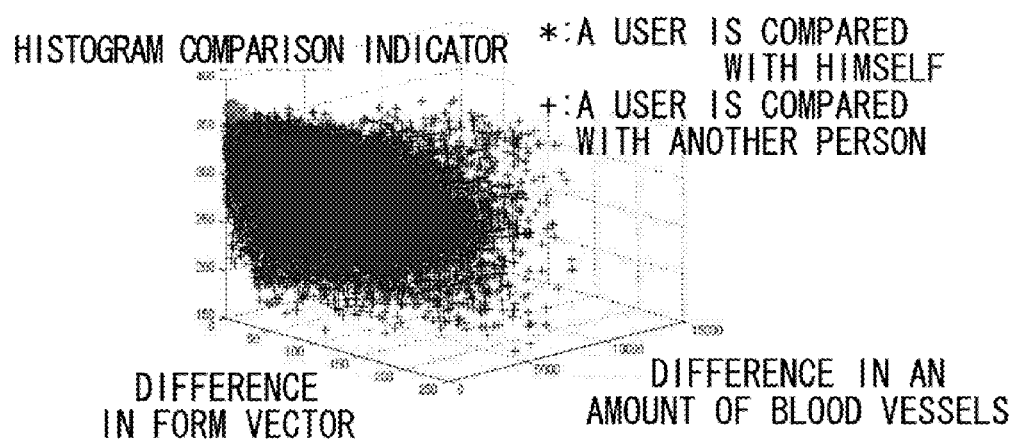
FIGS. 12A and 12B are schematic diagrams illustrating the result of an experiment.
Figure 12B:
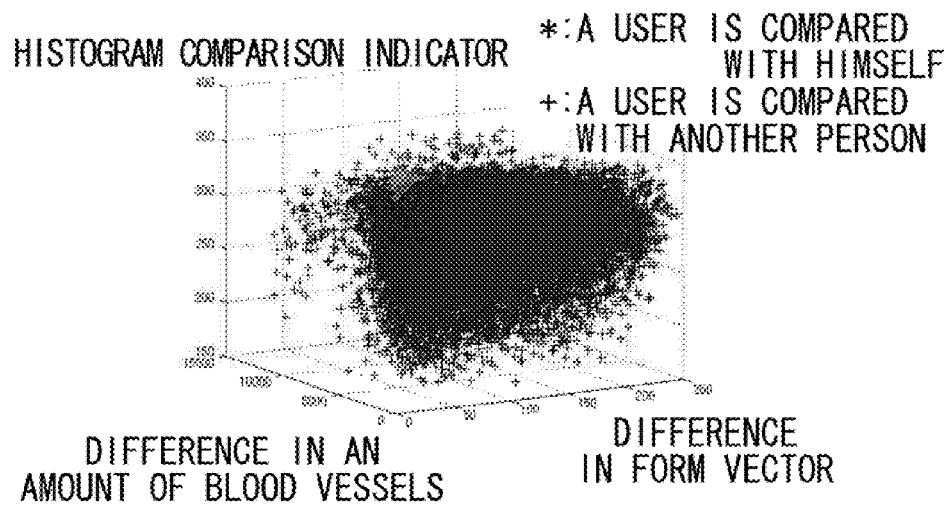

FIG. 12 shows the result of an experiment. In the case of FIG. 12, there were 50 people for this experiment; their fingers' vein images were registered (the number of images is 200); and each person's vein image was used for authentication. FIG. 12 shows a three-dimensional graph on which the information about the finger's outline, the information about the frequency distribution of the area surrounded by the finger's outline, and the information about the amount of veins in the area surrounded by the finger's outline were plotted. It is obvious from FIG. 12 that a group of gray marks (a group of persons who have been registered) is at the corner of a group of black marks (a group of persons who have not been registered): the information implies that it is highly likely that the verification targets include registrants' registration images.

Moreover, the authentication device 1 follows the above equations (1) and (2) to calculate the similarity value between the information about the finger's outline, the information about the frequency distribution of the area surrounded by the finger's outline, and the information about the amount of veins in the area surrounded by the finger's outline: it adds the ratio ES of the finger outline difference value S to the first threshold T1 and the ratio ED of the blood vessel difference value D to the third threshold T3 and subtracts from the resultant value the ratio EH of the finger area difference value H to the second threshold T2.

Accordingly, the authentication device 1's method of calculating the similarity value is simpler than when using other complex methods, such as variance or standard deviation (like correlation coefficients), because it only involves addition and subtraction. Accordingly, the process of authentication becomes faster.

Moreover, according to the method of the authentication device 1, the verification targets are selected based on the similarity value of the selection key information (the information about the finger's outline, the information about the frequency distribution of the area surrounded by the finger's outline, and the information about the amount of veins in the area surrounded by the finger's outline), and one verification target is determined based on the similarity value of the decision key information (thumbnail images) which gives more details than the selection key information.

In this manner, after roughly selecting the verification targets, the authentication device 1 carefully selects the verification target from them. Accordingly, the process of authentication becomes faster than when just using the selection key information or the decision key information to select the verification target, while it increases the possibility that the verification targets will include registrants' registration images.

Incidentally, according to MATLAB7.4.0, the time required to calculate the similarity value of the selection key information is less than 0.01 msec for one vein image. Moreover, if N/4 verification targets are selected from N images using the selection key information and the N/8 verification targets are selected from the selected N/4 images using the decision key information, the time required to calculate the similarity value is 3 msec according to MATLAB7.4.0: the time required until it make a determination as to whether the person is a registrant by comparing the selected verification targets with the piece of authentication-target vein information is 10 msec according to MATLAB7.4.0.

Accordingly, in theory, the average time of the above procedure of the authentication process is 0.3651N+10 msec (0.01·N msec+3N/8 msec+10 msec). On the other hand, if the verification targets are selected using only the decision key information (thumbnail images) without using the selection key information, the average time, in theory, is 1.5N+10 msec.

This means that the process of authentication of the authentication device 1, which first roughly selects the verification targets using the selection key information and then carefully selects the verification targets from them using the decision key information, is about four times faster than when only using the decision key information to select the verification targets.

According to the above configuration, since it uses the finger's outline which is detected at an intermediate stage of the extraction process of the vein information to select the verification targets, the authentication device 1 is able to complete the selection of the verification targets during the extraction process of the authentication-target vein information. Moreover, it decreases the possibility that the verification targets do not include registrants' registration images more than when those including pseudo factors are used. As a result, the authentication device 1 whose authentication process is fast can be realized.

(2) Second Embodiment (2-1) Exterior View of a Cell Phone

Figure 13:
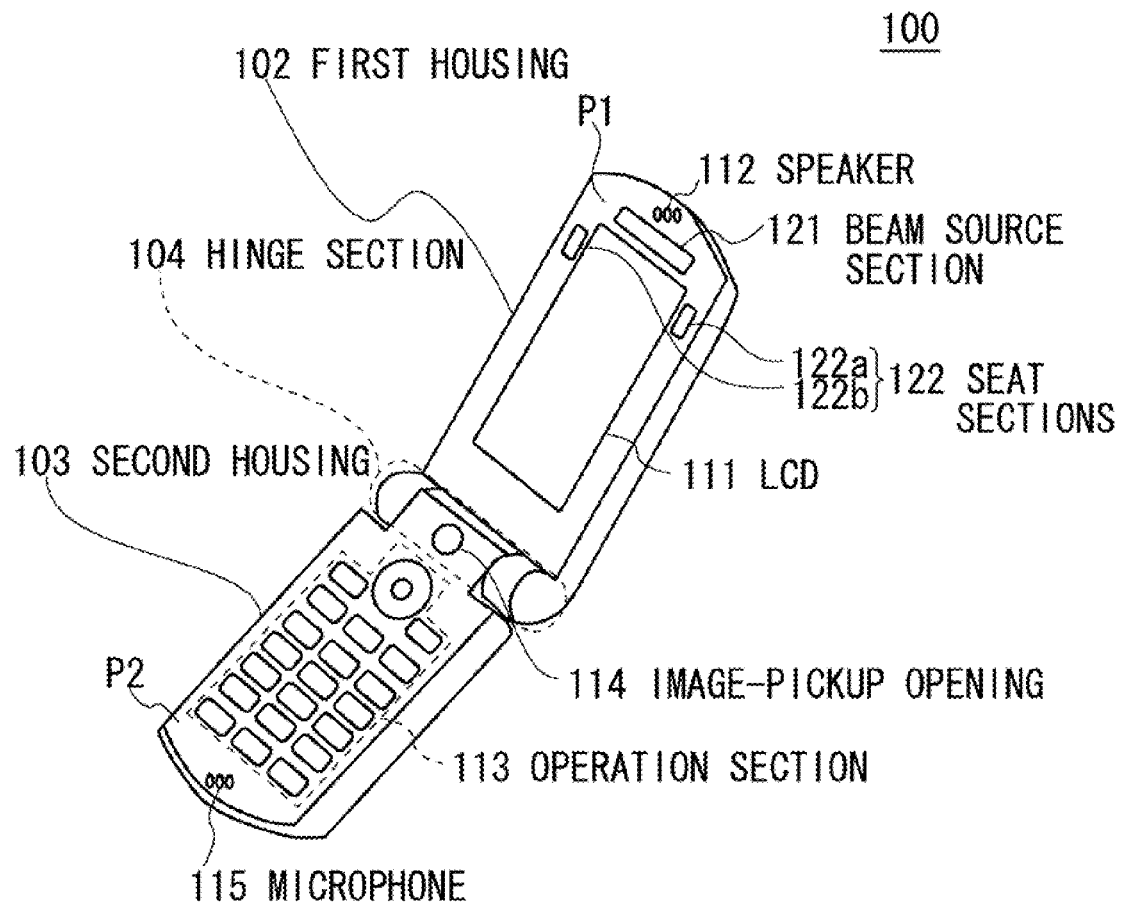
FIG. 13 is an appearance view of a cell phone.

FIG. 13 is an exterior view of a cell phone 100 according to a second embodiment of the present invention. The cell phone 100 includes a first housing 102 and a second housing 103, which are substantially rectangular parallelepiped, and a hinge section 104.

Liquid Crystal Display (LCD) 111 is situated at the center area of one surface P1 of the first housing 102. One edge of the one surface P1 is a concave edge section. A speaker 112 is situated at the other edge.

An operation section 113 is situated at the center of one surface P2 of the second housing 103: the operation section 113 includes a power key, a call key, a menu key, a character input key and the like. One edge of the one surface P2 is a convex edge section, which corresponds to the concave edge section of the first housing 102. An image-pickup opening 114 is situated at the convex edge section. A microphone 115 is situated at the other edge of the one surface P2.

Figure 14:
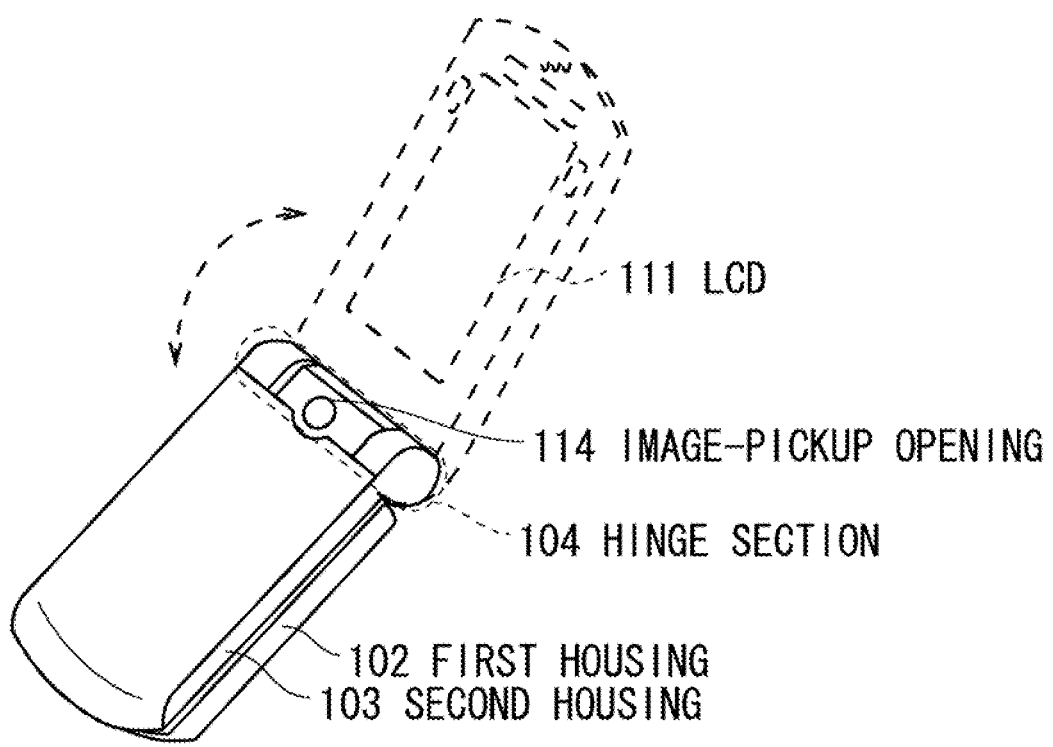
FIG. 14 is a schematic diagram illustrating a motion range of a cell phone.

The hinge section 104 includes a rotational shaft that passes through the concave edge section of the first housing 102 and the convex edge section of the second housing 103. Around this rotational shaft, as shown in FIG. 14, the first housing 102 and the second housing 103 rotate until the surface P1 contacts the surface P2 (this situation is also referred to as closing state, hereinafter) or until the surface P1 makes a predetermined angle with respect to the surface P2 (this situation is also referred to as opening state, hereinafter).

Regardless of whether the cell phone 100 is in opening or closing state, the convex edge section of the second housing 103 is always exposed. This allows the cell phone 100 to take a photo through the image-pickup opening 114, regardless of whether the cell phone 100 is in opening or closing state.

In addition, the cell phone 100 is configured in a way that allows an image-pickup beam that has captured the blood vessels of a finger placed at a predetermined position of the first housing to enter the image-pickup opening 114. More specifically, a beam source section 121 is situated between the upper side of the LCD 111 and the speaker 112: the beam source section 121 emits a near-infrared beam. A pair of seat sections 122 (122a and 122b) is situated on the upper side of the surface P1: the seat sections 122a and 122b are thin plates, placed at both sides of the LCD 111.

Figure 15:
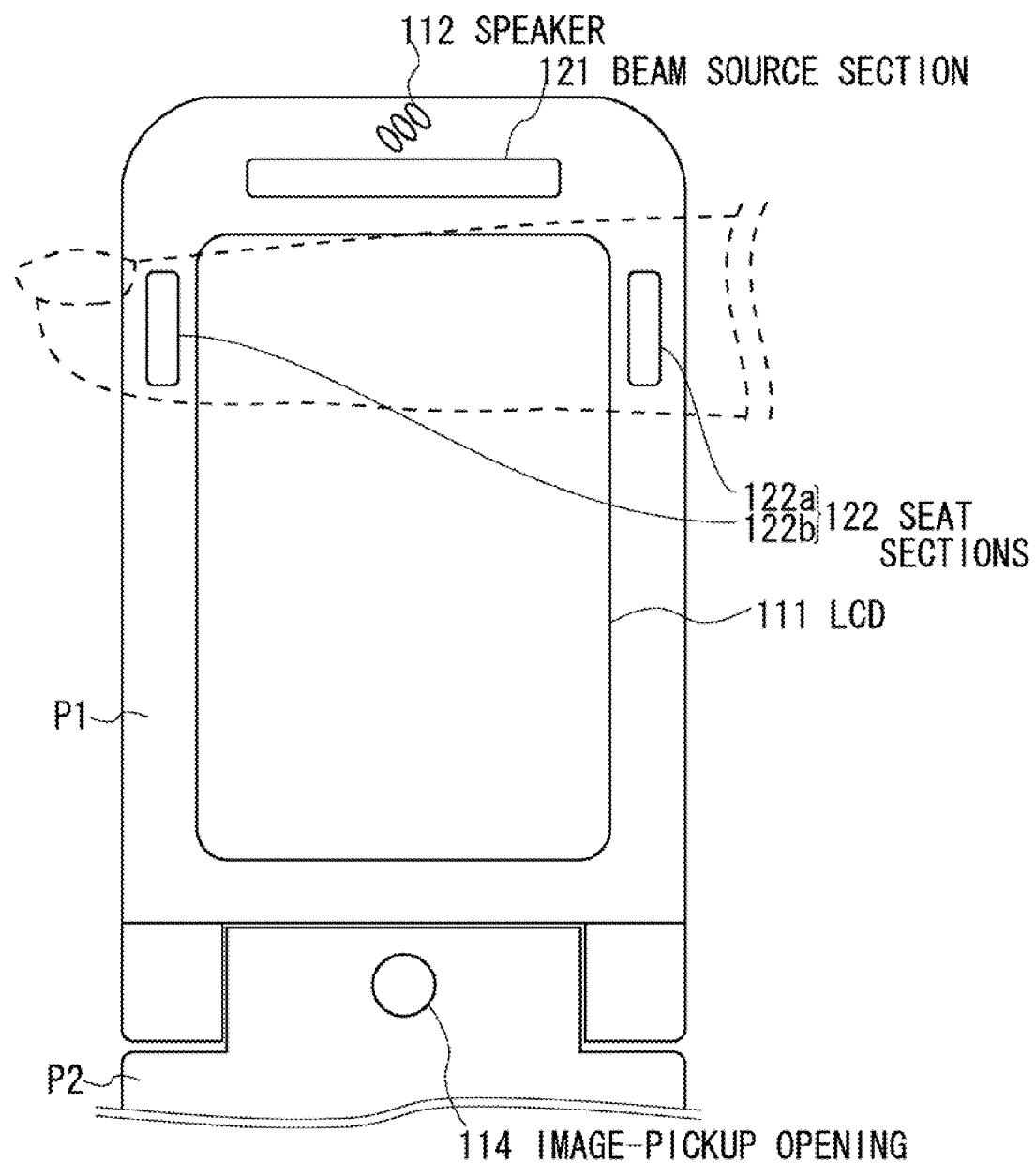
FIG. 15 is a schematic diagram illustrating how a finger is placed along the upper side of LCD with the help of a beam source section and seat sections.

Accordingly, as shown in FIG. 15, the positions of the seat sections 122 and the position of the beam source section 121 (with respect to the seat sections 122) imply that a finger should be placed on the LCD 111 along the upper side of the LCD 111, not the upper area of the surface P1 above the LCD 111 (i.e. on the speaker 112). Moreover, according to this cell phone 100, the seat sections 122 prevent a finger from touching the LCD 111, keeping the surface of the LCD 111 clean.

Figure 16:
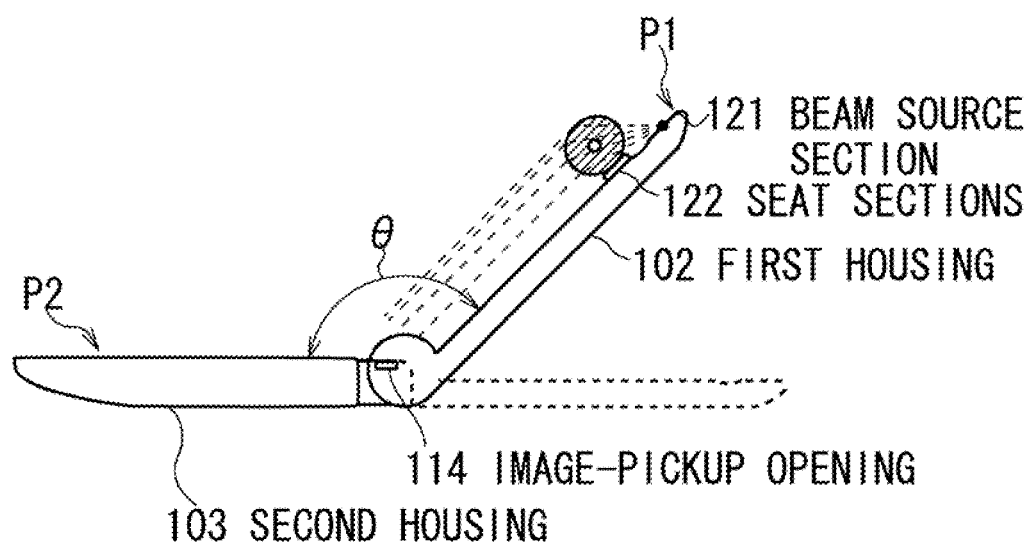
FIG. 16 is a schematic diagram illustrating the image-pickup state of blood vessels.

For example, as shown in FIG. 16, when the cell phone 100 is in opening state and a finger is placed at the predetermined position of the first housing 102, an near-infrared beam from the beam source section 121 gets into the finger and reaches beyond its vein layer; the beam comes out of the finger after being reflected or scattered inside the finger.

A part of the near-infrared beam coming out of the finger becomes exactly or substantially parallel to the one surface P1 of the first housing 102, enters the image-pickup opening 114, and reaches Charge Coupled Device (CCD) via an optical system inside the second housing 103. The bright part of the near-infrared beam represents the non-vein portion of the finger because it did not pass through the vein layer, while the dark part of the near-infrared beam represents the vein portion of the finger because it passed through the vein layer whose hemoglobin absorbed the beam.

(2-2) Circuit Configuration of the Cell Phone

Figure 17:
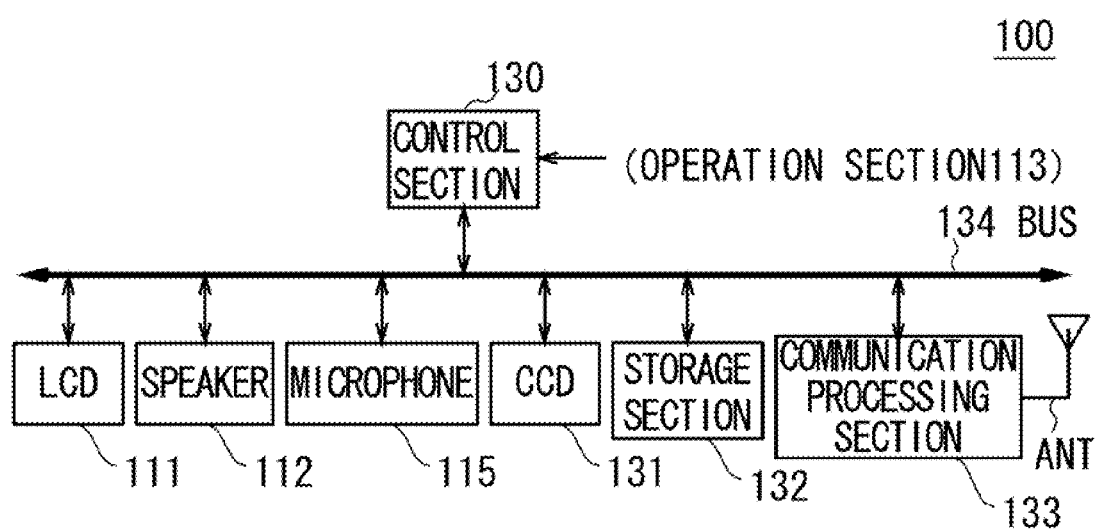
FIG. 17 is a block diagram illustrating the circuit configuration of a cell phone.

The following describes the circuit configuration of the cell phone 100. As shown in FIG. 17 (whose parts have been designated by the same symbols and marks as the corresponding parts of FIG. 13), the cell phone 100 includes a control section 130 to which the LCD 111, the speaker 112, the microphone 115, CCD 131, a storage section 132 and a communication processing section 133 are connected via a bus 134.

The control section 130 is a computer including CPU, which take overall control of the cell phone 100, ROM, which stores a boot program or the like, and RAM, which serves as a work memory for CPU.

The operation section 113 inputs various commands into the control section 130: the commands include an execution command of blood vessel registration mode, an execution command of authentication mode, and other execution commands regarding the creating and sending of e-mails, making a phone call, and the like.

Based on the input command, the control section 130 recognizes which mode it should start. Following a program corresponding to the recognized mode, the control section 130 appropriately controls the LCD 111, the speaker 112, the microphone 115, the CCD 131, the storage section 132 and the communication processing section 133 to perform various processes.

Based on display data supplied from the control section 130, the LCD 111 displays characters, figures and other things on its screen. Based on sound data supplied from the control section 130, the speaker 112 outputs sound. The microphone 115 captures sound, generates sound data at a predetermined interval, and then supplies them to the control section 130.

The CCD 131 converts the image-pickup beam, which is input from the image-pickup opening 114 (FIG. 13) at a predetermined interval, into electronic signals, and transmits them to the control section 130 as image data.

The storage section 132 stores various data, such as the vein information, programs, and setting information. Under the control of the control section 130, the storage section 132 stores or reads out data.

The communication processing section 133 performs a predetermined modulation process for various data supplied from the microphone 115 or the control section 130, amplifies them, and transmits resultant signals as uplink wave signals to a base station (not shown) via an antenna ANT that the cell phone 100 has.

On the other hand, the communication processing section 133 receives downlink wave signals from a base station (not shown) via the antenna ANT, amplifies them, and then performs a predetermined demodulation process. The communication processing section 133 transmits resultant data to the speaker 112 or the control section 130.

(2-2-1) Vein Registration Mode

The following describes a vein registration mode. After recognizing that it should start the vein registration mode, the control section 130 uses the LCD 111 or the speaker 112, or both, to urge a user to open the cell phone 100 (so that the first and second housings 102 and 103 are in opening state, as shown in FIG. 16), keep his finger straight and put it on the LCD 111 (FIG. 15).

Figure 2:
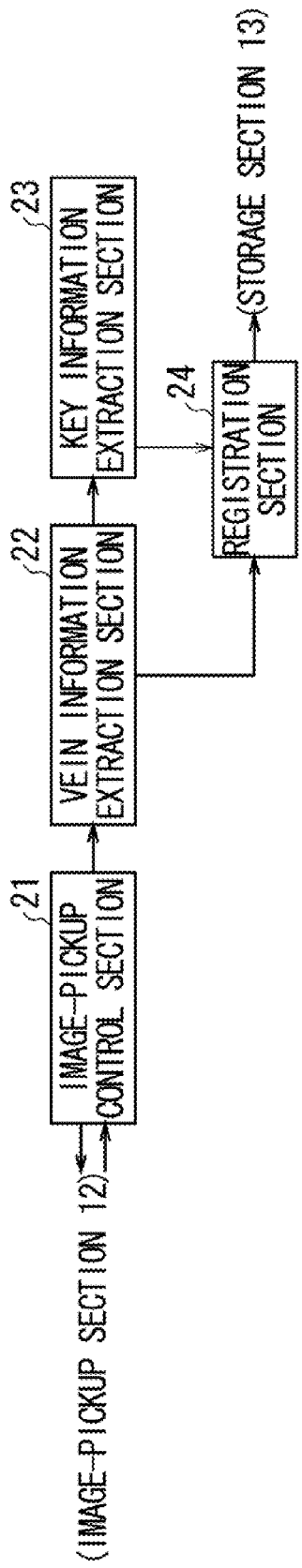
FIG. 2 is a block diagram illustrating the functional configuration of a control section in vein registration mode (1)
Figure 18:
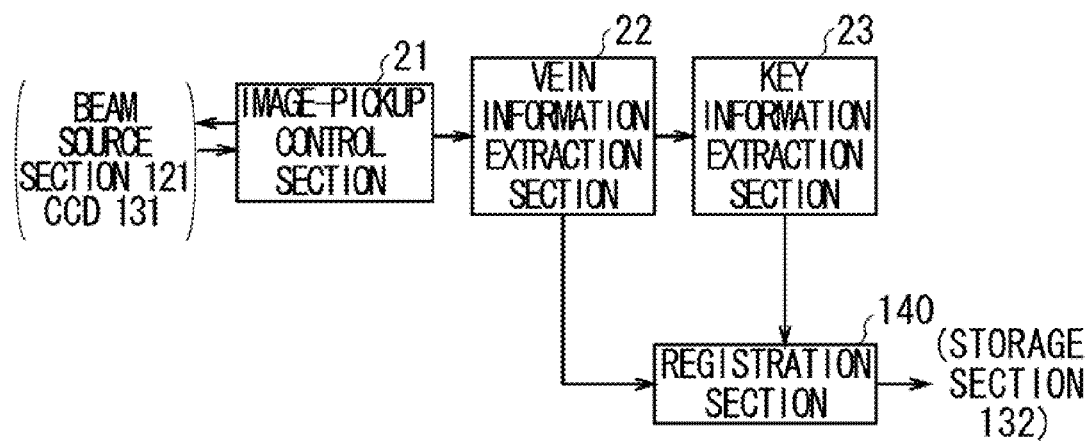
FIG. 18 is a block diagram illustrating the functional configuration of a control section in vein registration mode (2)
Figure 19:
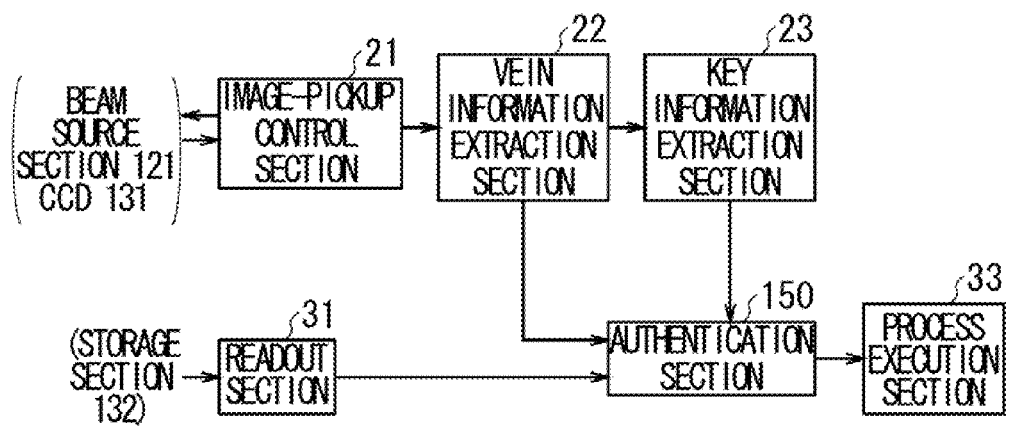
FIG. 19 is a block diagram illustrating the functional configuration of a control section in authentication mode (2)

After that, as shown in FIG. 18 (whose parts have been designated by the same symbols and marks as the corresponding parts of FIG. 2), the control section 130 offers the following functions: a image-pickup control section 21, a vein information extraction section 22, a key information extraction section 23 and a registration section 140. The following provides only the description of the registration section 140, which is different from the registration section 24 of the first embodiment.

The registration section 140 makes a determination as to whether a piece of the vein information is suitable for registration based on the amount of the piece of vein information extracted by the vein information extraction section 22, the shape of a vein pattern, and the like. If it is suitable for registration, the registration section 140 then makes a determination as to whether one registrant has already registered them more than a preset registration number (two or more).

If the piece of vein information obtained is not suitable for registration or the number has not yet reached the registration number, the registration section 140 notifies uses accordingly using either the LCD 111 or the speaker 112, or both.

By contrast, if the number of the pieces of vein information suitable for registration has reached the registration number, the registration section 140 associates the pieces of vein information with the pieces of key information, which were extracted by the key information extraction section 23 from the images during the process of extracting the pieces of vein information from these images, and stores these pairs (also referred to as registration sets, hereinafter) in the storage section 132.

In that manner, the registration section 140 obtains the pieces of vein information and the pieces of key information from the same finger, and registers them. This is different from what the registration section 24 of the first embodiment does because the registration section 24 obtains only one piece of vein information and a corresponding piece of key information from one finger.

(2-2-2) Authentication Mode

The following describes an authentication mode. After recognizing it should start the authentication mode, the control section 130 uses the LCD 111 or the speaker 112, or both, to urge a user to open the cell phone 100 (so that the first and second housings 102 and 103 are in opening state, as shown in FIG. 16), keep his finger straight and put it on the LCD 111 (FIG. 15).

If there is one registration set in the storage section 132, the piece of vein information of this registration set is given by the readout section 31 to an authentication section 150. In this case, the authentication section 150 makes a determination as to whether he is a registrant (the success or failure of authentication) using the piece of registration-target vein information read out by the readout section 31 and the piece of authentication-target vein information extracted by the vein information extraction section 22.

By contrast, if there is a plurality of registration sets in the storage section 132, the pieces of registration-target key information corresponding to the pieces of vein information of the registration sets are given to the authentication section 150 by the readout section 31.

In this case, the authentication section 150 selects, from among the registration sets registered in the storage section 132, one to be compared with the piece of authentication-target vein information extracted by the vein information extraction section 22, using the pieces of registration-target key information read out by the readout section 31 and the piece of authentication-target key information extracted by the key information extraction section 23.

Moreover, the authentication section 150 lets the readout section 31 read out the piece of vein information of the selected registration set, and makes a determination as to whether he is a registrant (the success or failure of authentication) using the piece of registration-target vein information read out by the readout section 31 and the piece of authentication-target vein information extracted by the vein information extraction section 22.

In this manner, the authentication section 150 selects a verification target, which is to be compared with the authentication target, for each group of vein information which is regarded as a registration set. This is different from what the authentication section 32 of the first embodiment does because the authentication section 32 selects the verification targets for respective pieces of vein information. Moreover, the authentication section 150's method of selecting the final verification targets is different from that of the authentication section 32 of the first embodiment. The authentication section 150's method is described below.

(2-3) Configuration of the Authentication Section

Figure 20:
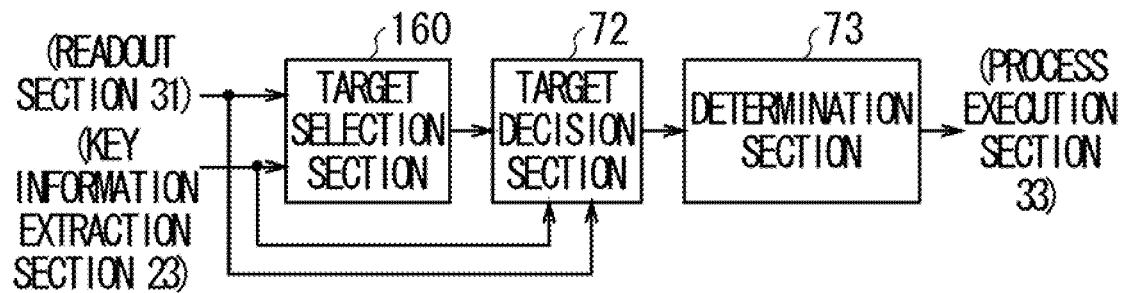
FIG. 20 is a block diagram illustrating the configuration of an authentication section (2)
Figures 21A, 21B:
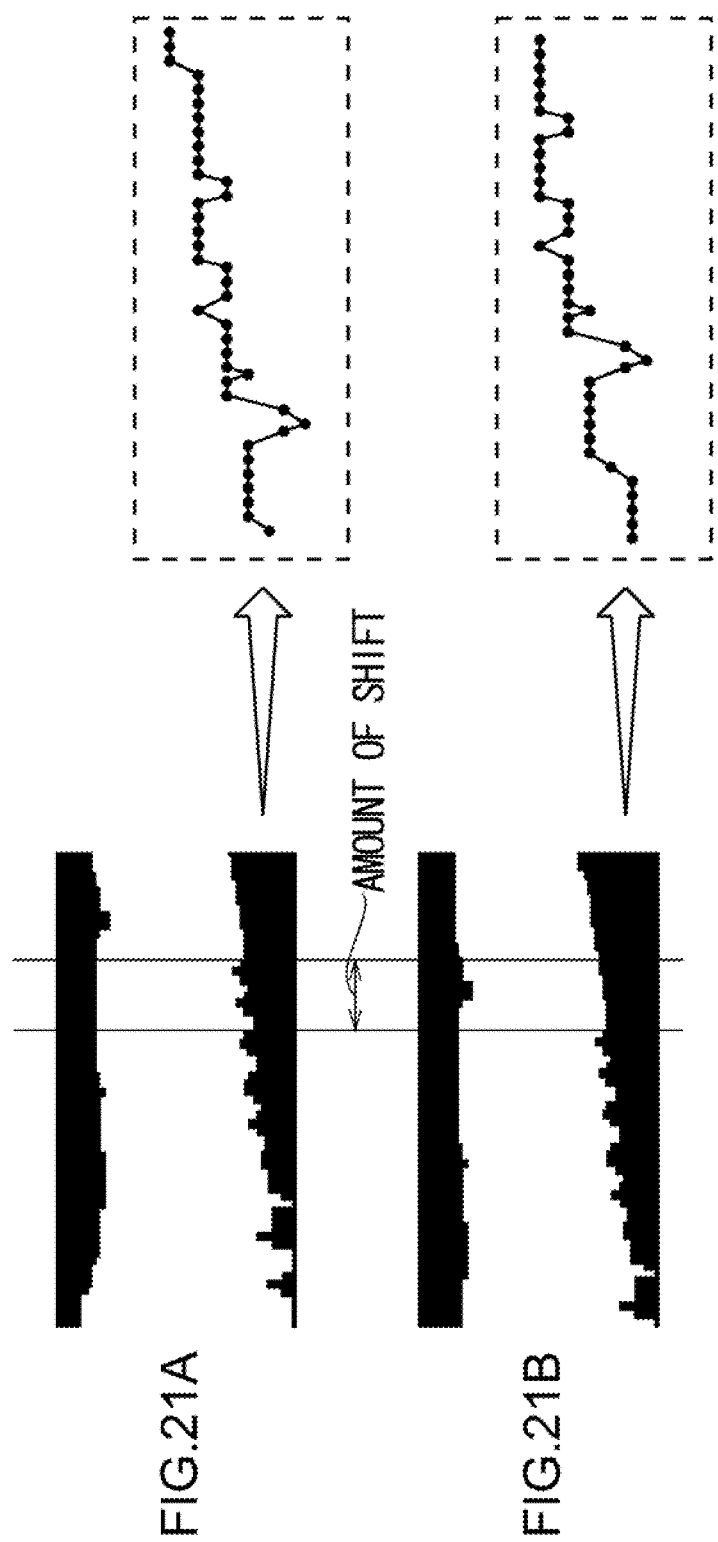
FIGS. 21A and 21B are schematic diagrams illustrating the difference in shape caused by a finger placed at a different position in terms of the longitudinal direction of the finger.

The following describes the configuration of the authentication section 150. As shown in FIG. 20 (whose parts have been designated by the same symbols and marks as the corresponding parts of FIG. 10), the authentication section 150 includes a target selection section 160, a target decision section 72 and a determination section 73. The following provides only the description of the target selection section 160, which is different from the target selection section 71 of the first embodiment.

The target selection section 160 compares each element of the registration-target selection key information (the position (coordinate value) of the finger's outline, the number of pixels in each brightness group, and the number of vein pixels) read out from the storage section 132 by the readout section 31 with a corresponding element of the authentication-target selection key information (the coordinate value of the finger's outline, the number of pixels in each brightness group, and the number of vein pixels) extracted by the key information extraction section 23.

The target selection section 160 compares the pieces of selection key information containing the coordinate values of the finger's outline. This target selection section 160 takes into account the position of the finger: the finger can be placed at a different position as if it moves along the longitudinal direction of the finger. By contrast, the target selection section 71 of the first embodiment does not take it into account.

That is, the target selection section 71 calculates the differences between the registration-target selection key information (the x coordinate values of the finger's outline) and the authentication-target selection key information (the x coordinate values of the finger's outline) on per row (or column) basis and then calculates the total of their absolute values. Accordingly, if the position of the finger put on the upper side of the LCD 111 for authentication is different in the longitudinal direction of the finger from the position of the finger for registration, the target selection section 71 may assume that their shapes are different, as shown in FIG. 20, for example, even though they are the same person's finger.

Accordingly, in this case, the finger outline difference value may rise even though they are the same person's finger: this prevents the target selection section 71 from selecting an appropriate verification target (piece of vein information).

Therefore, the target selection section 160 recognizes either the piece of registration-target selection key information (the x coordinate value of the finger's outline) or the piece of authentication-target selection key information (the x coordinate value of the finger's outline) as a shift target, and moves the shift target (the x coordinate value of the finger's outline) SK a predetermined distance, with respect to the other (the x coordinate value of the finger's outline) NS, from a starting position (FIG. 22A) to an ending position (FIG. 22B) in the longitudinal direction of the finger.

Figure 22C:
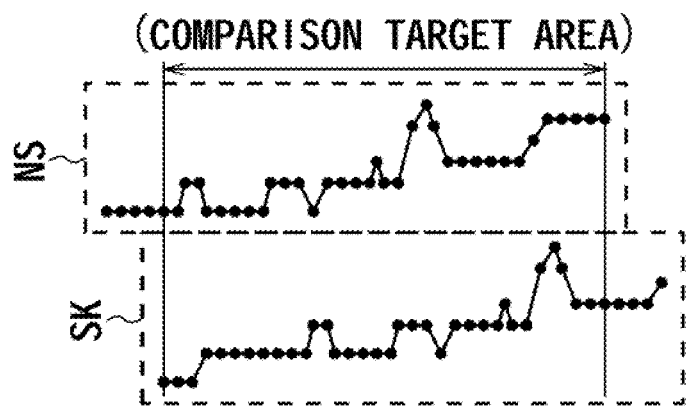
FIGS. 22A to 22C are schematic diagrams illustrating the calculation of a finger outline difference value in which the position of a finger is taken into account.
Figure 22B:
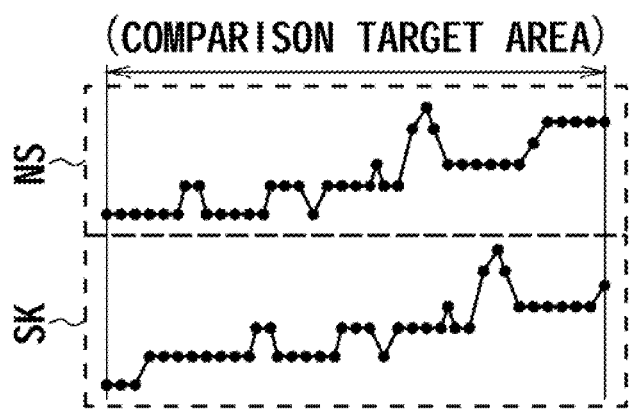
Figure 22A:
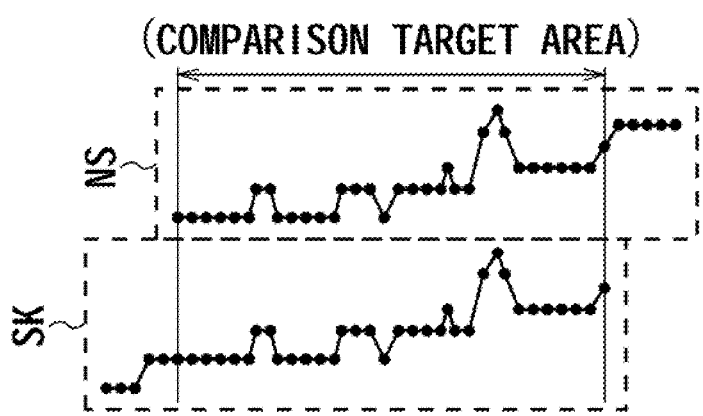

Moreover, at each shift position including the starting position and the ending position, the target selection section 160 calculates the average of the ratios of the absolute-value differences in the corresponding finger's outline portions (an area indicated by arrows in FIG. 22). The target selection section 160 then recognizes the minimum value as the finger outline difference value. Incidentally, in the case of FIG. 22, the minimum value is obtained in the situation of FIG. 22A.

More specifically, the target selection section 160 calculates the finger outline difference value as follows:

$$s = \min\left(\sum_{p=1}^{l_v-lS_{max}} \frac{\|S_{(r,p)} - S_{(i,p+lS_{max})}\|}{(l_v - lS_{max})}, \right.$$

$$\sum_{p=1}^{l_v-lS_{max}+1} \frac{\|S_{(r,p)} - S_{(i,p+(lS_{max}-1))}\|}{(l_v - lS_{max} + 1)}, \ldots,$$

$$\sum_{p=1}^{l_v} \frac{\|S_{(r,p)} - S_{(i,p)}\|}{l_v} \sum_{p=2}^{l_v} \frac{\|S_{(r,p)} - S_{(i,p-1)}\|}{(l_v - 1)}, \ldots,$$

$$\left. \sum_{p=lS_{max}}^{l_v} \frac{\|S_{(r,p)} - S_{(i,p-(lS_{max}-1))}\|}{(l_v - lS_{max} + 1)} \sum_{p=lS_{max}+1}^{l_v} \frac{\|S_{(r,p)} - S_{(i,p-(lS_{max}))}\|}{(l_v - lS_{max})} \right) \quad (3)$$

wherein lv represents the length of the finger's outline, lSmax represents the maximum value of the amount of shift, p represents indexes (position) constituting the finger's outline, S represents the value of the index (position), r means the registration target and i means the authentication target.

In that manner, the target selection section 160 takes into account the position of the finger.

Also, the target selection section 160 compares the pieces of selection key information containing the number of pixels in each brightness group and the number of vein pixels: the target selection section 160 calculates the finger area difference value and the blood vessel difference value in the same way as that of the target selection section 71 of the first embodiment.

Moreover, after comparing the pieces of selection key information and obtaining the finger outline difference value, the finger area difference value and the blood vessel difference value, the target selection section 160 uses the equation (1) in the same way as that of the first embodiment so that the width of the quantity regarding the finger outline difference value, the finger area difference value and the blood vessel difference value is constant (normalization).

After that, the target selection section 160 generates an evaluation value (based on which the verification targets are evaluated on per registration set basis) using the normalized finger outline difference value, finger area difference value and blood vessel difference value. This is different from that of the first embodiment's target selection section 71 which generates an evaluation value for each piece of registration-target vein information.

This is because the pieces of vein information in one registration set have been obtained from the same person and they are just slightly different. The same holds for the resultant evaluation values: the evaluation values calculated from the pieces of vein information in one registration set are just slightly different and small.

Figure 23:
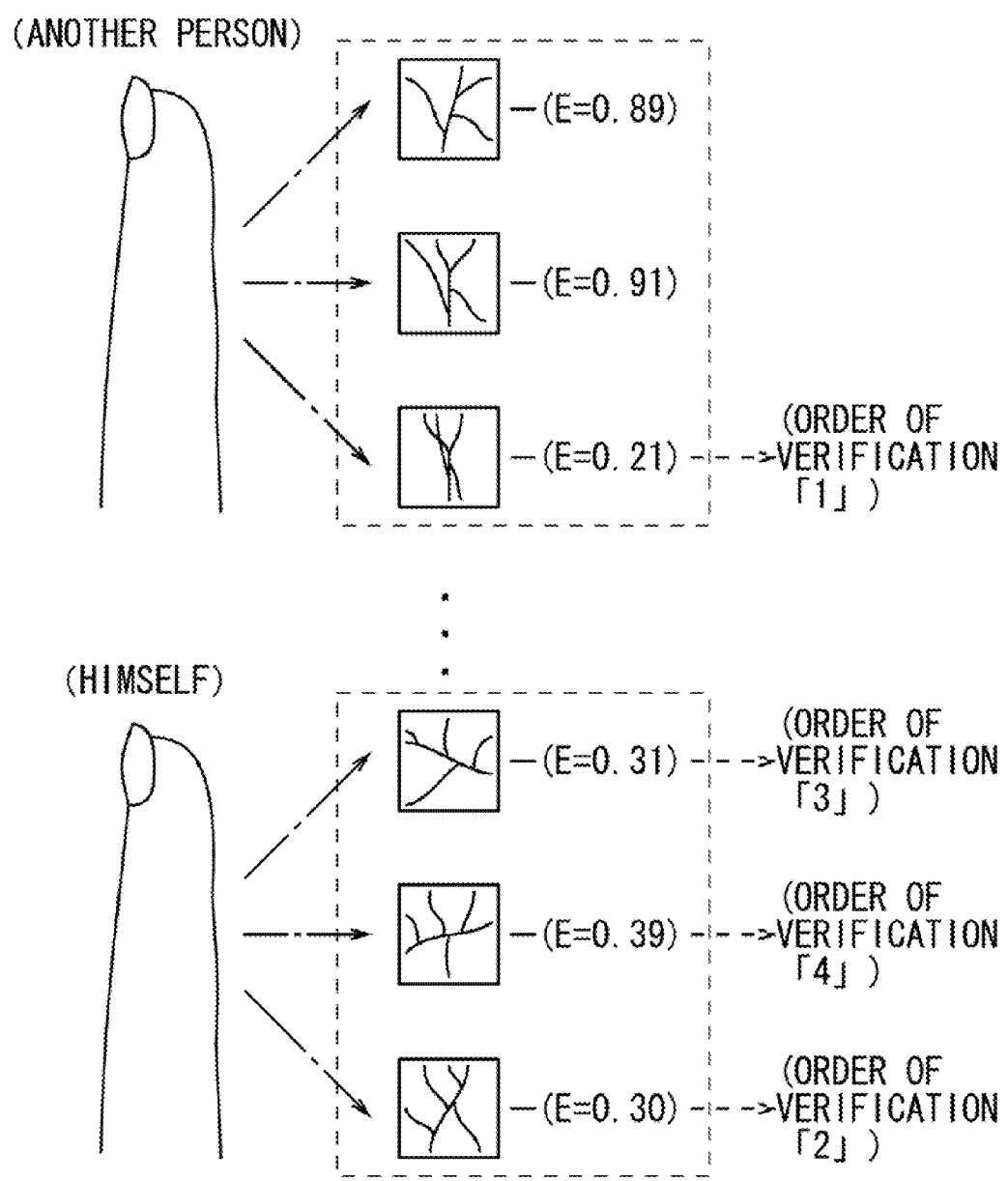
FIG. 23 is a schematic diagram illustrating the negative effect that occurs as a result of selecting verification targets using an evaluation value of vein information.

However, for example, as shown in FIG. 23, if only one evaluation value E, among a plurality of evaluation values calculated from the pieces of vein information in one registration set, is small, then it is highly likely that a person corresponding to this registration set is not a registrant. But the target selection section 71 of the first embodiment would select that piece of vein information, whose evaluation value E is the largest, as a verification target before selecting the other pieces; this could delay the process of authentication.

Figure 24:
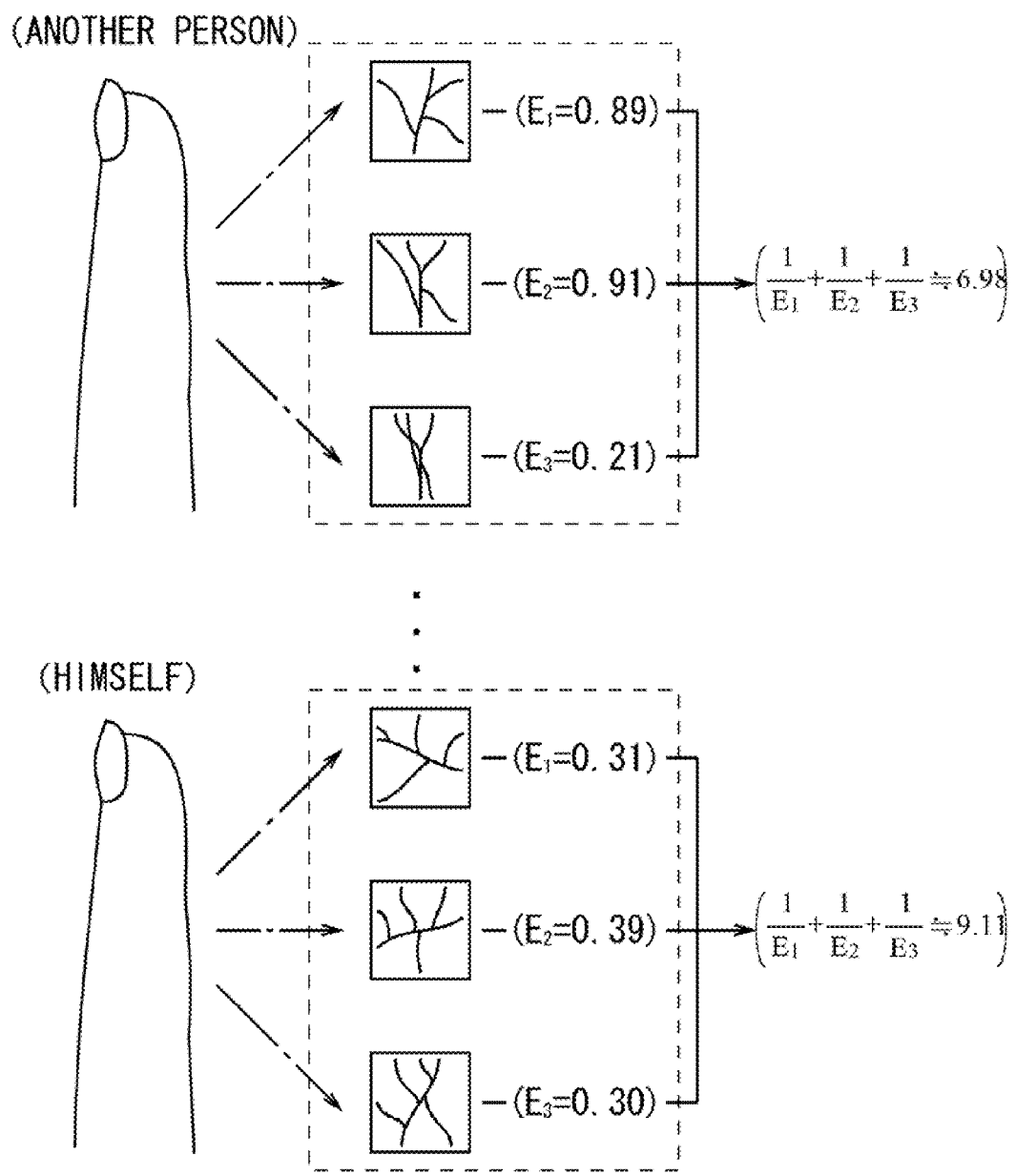
FIG. 24 is a schematic diagram illustrating the calculation of an evaluation value for a registration set.

Accordingly, for example, as shown in FIG. 24, the target selection section 160 calculates the evaluation values E of the pieces of vein information in each registration set using the equation (2); calculates the inverse number of each evaluation value E; and then calculates the total of the evaluation values E for each registration group. The target selection section 160 uses the total value as an evaluation value of the registration set. The larger this evaluation value, the more likely lie is to be a registrant. This is because this evaluation value of the registration set is the total of the inverse numbers of the evaluation values E of the vein information (the smaller the evaluation values E, the more likely he is to be a registrant).

In this manner, the target selection section 160 calculates the evaluation value for each registration set, or each group of the vein information. This improves the accuracy in selecting the verification targets, even when only one piece of vein information in the registration set has a large evaluation value E.

By the way, if the evaluation value of the registration set is the average of the values calculated by the equation (2) or the total of these values, the evaluation value of the registration set becomes so large that other persons' registration sets can be selected as the verification targets before registrants' sets are selected. This could delay the process of authentication. However, the evaluation value of the registration set calculated by the target selection section 160 is the total of the inverse numbers of the values calculated by the equation (2). This prevents that from happening.

Incidentally, the target selection section 160 calculates the evaluation values of the registration sets, selects the pieces of selection key information corresponding to the registration sets whose evaluation values are greater than or equal to a threshold that has been set for the evaluation values, and the pieces of registration-target vein information associated with these pieces of selection key information, regards them as the verification targets, which are to be compared with the piece of authentication-target vein information, and sorts them in a verification order in the same way as the target selection section 71 of the first embodiment.

(2-4) Operation and Effect

With the above configuration, the cell phone 100 calculates the finger outline difference value, which is an indicator for the selection of the verification targets, from the registration-target selection key information (the x coordinate values of the finger's outline), which represents the shape of the finger's outline, and the authentication-target selection key information (the x coordinate values of the finger's outline). At this time, the cell phone 100 takes into account the position of the finger, because the finger could be placed at a different position as if it moves along the longitudinal direction of the finger (the equation (3) and FIG. 22).

This allows the cell phone 100 to calculate the finger outline difference value (which is one of the indicators for the selection of the verification targets) more accurately than when not taking that into account. Therefore, the cell phone 100 can select the registrant's piece of vein information as the verification target if he puts his finger on the cell phone 100. As a result, the process of authentication becomes faster.

In addition, the configuration of the cell phone 100 encourages a user to put his finger appropriately on the cell phone 100 (FIG. 15): the upper side of the LCD 111 and the seat sections 122 are situated where the beam from the beam source section 121 reaches; the upper side of the LCD 111 encourages a user to put his finger so that his finger's longitudinal line is aligned with the upper side of the LCD 111; CCD is situated on the opposite side of them from the beam source section 121.

The cell phone 100 can omit an calculation process in which the position of the finger is taken into account because the cell phone 100 takes into account the position of the finger when calculating the finger outline difference value from the selection key information (the x coordinate values of the finger's outline) of the image output from the CCD. As a result, the process of authentication becomes faster.

Moreover, the cell phone 100 running in registration mode registers the pieces of vein information obtained from the same finger and the corresponding pieces of key information as one registration set. Running in authentication mode, the cell phone 100 selects the registration set to be compared with the piece of authentication-target vein information.

More specifically, the cell phone 100 calculates the total of the inverse numbers of the evaluation values E calculated by the equation (2) from each piece of vein information in the registration set (FIG. 24). In this manner, even though it recognizes the pieces of vein information as one registration set, the cell phone takes into account the evaluation value E of each piece of vein information in the registration set more carefully than when it uses the other methods in which the average or total of the evaluation values E is used.

Therefore, the cell phone 100 can select the registrant's piece of vein information as the verification target if he puts his finger on the cell phone 100. As a result, the process of authentication becomes faster.

According to the above configuration, the cell phone 100 can accurately calculate the finger outline difference value, which is one of the indicators for the selection of the verification targets. Moreover, the cell phone 100 calculates an evaluation value from the indicator for each registration set. As a result, the authentication process of the cell phone 100 is faster than that of the authentication device 1.

(3) Other Embodiment

In the above-noted embodiments, as a vein information extraction section that extracts the vein information, which represents the vein, from the image containing the finger's vein, the vein information extraction section 22 including the sections 41 to 48 (FIG. 4) is applied. However, the present invention is not limited to this. Some of the sections 41 to 48 may be omitted or replaced. Moreover, another processing section may be added to them. The same holds for the processes of the sections 41 to 48 (kernel size, or the like, for example).

Moreover, in the above-noted embodiments, the information about the position of the finger's outline, the information about the frequency distribution of the area surrounded by the finger's outline, and the information about the amount of veins in the area surrounded by the finger's outline are extracted at an intermediate stage of the extraction process of the vein information. However, the present invention is not limited to this. As long as the information about the position of the finger's outline is extracted, the others can be omitted or replaced. Moreover, another kind of information may be added to them.

This is because the information about the position of the finger's outline was the most accurate when only one of them (the information about the position of the finger's outline, the information about the frequency distribution of the area surrounded by the finger's outline, or the information about the amount of veins in the area surrounded by the finger's outline) was used.

Furthermore, in the above-noted embodiments, the device selects the verification targets using the selection key information, and then selects (or determines) the final verification targets from them using the decision key information. However, the present invention is not limited to this. The device may select the final verification targets using the selection key information. This could increase the speed of the authentication process more than the typical authentication methods.

Furthermore, in the above-noted embodiments, the information about the position of the finger's outline is the information about the distance from the point of reference in the predetermined area (FIG. 7). However, the present invention is not limited to this. Other extraction methods can be applied: the device may use Bezier to extract control points.

Furthermore, in the above-noted embodiments, as the frequency distribution of the finger area, the brightness histogram is applied. However, the present invention is not limited to this. A histogram may be extracted for the three primary colors, or one or some of them. Other extraction method could be used.

Figure 3:
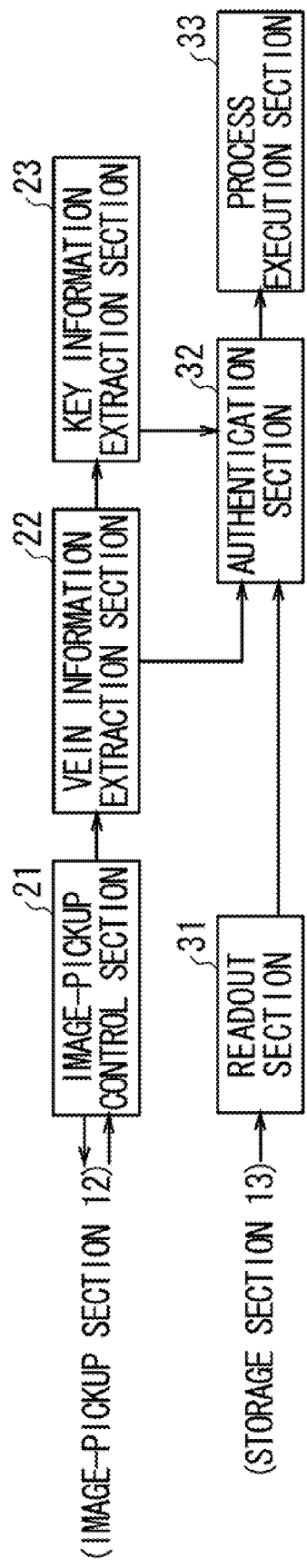
FIG. 3 is a block diagram illustrating the functional configuration of a control section in authentication mode (1)

Furthermore, in the above-noted embodiments, the authentication device 1 includes the image-pickup function (the image-pickup section 12), the registration function (FIG. 2), and the authentication function (FIG. 3). However, the present invention is not limited to this. Depending on how they are used, those functions may be separately given to different devices; one of the devices may have two or more of the functions.

The above methods can be used for biometrics authentication.

The present application contains subject matter related to that disclosed in Japanese Priority Patent Application JP2008-126207 filed in the Japan Patent Office on May 13, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An authentication device comprising:
a physical central processing unit (CPU);
a vein information extraction section, performed by the CPU, that extracts a piece of vein information representing a vein from an image containing a vein of a finger, the extraction of the vein information comprising a plurality of intermediate processes before completing the extraction at a final process;
an extraction section, performed by the CPU, that extracts a first piece of information from a first one of the intermediate processes performed by the vein information extraction section to extract the piece of vein information, the first piece of information representing a first outline of the finger; and
a determination section, performed by the CPU, that determines a verification target to be compared with the piece of vein information based on a degree of similarity between the first piece of information and a piece of extraction information extracted from the verification target,
wherein the first piece of information is extracted from a predetermined partial area of the image such that the first outline of the finger is a partial portion of a full outline in the image, and represents positions of first pixels of the first outline with respect to second pixels at an edge of the predetermined partial area of the image.

2. The authentication device according to claim 1, wherein the first piece of information represents a first distance between one of the first pixels and one of the second pixels.

3. The authentication device according to claim 2, wherein the determination section uses a degree of difference between the first distance and a second distance of the piece of extraction information, to determine the verification target to be compared with the piece of vein information.

4. The authentication device according to claim 3, wherein the second distance is extracted from a partial area of the verification target; and
the degree of difference comprising a shift distance between the predetermined partial area of the image and the partial area of the verification target.

5. The authentication device according to claim 1, further comprising:
an image-pickup section for picking up the image; and
an indication section for a finger to be aligned therewith.

6. The authentication device according to claim 1, wherein the extraction section extracts the first piece of information when the vein information extraction section removes a noise from the image.

7. The authentication device according to claim 1, wherein the extraction section further extracts a second piece of information from a second one of the intermediate processes, the second one of the intermediate processes being different from the first one of the intermediate processes.

8. The authentication device according to claim 1, wherein the extraction section obtains from the vein information extraction section a binarization image obtained from a second one of the intermediate processes, and extracts the first piece of information so that the first piece of information comprises an amount of veins within the first outline of the finger in a predetermined partial area of the image.

9. The authentication device according to claim 7, wherein the second piece of information comprises a first amount of veins within the first outline of the finger in a predetermined partial area of the image; and
the determination section determines the verification target based on a difference of the first amount of veins and a second amount of veins extracted from the verification target.

10. The authentication device according to claim 1, further comprising:
a generation section that obtains from the vein information extraction section an binarized image containing a vein portion whose vein width is constant and a background portion and compresses the binarized image, wherein
the determination section determines the verification target based on a degree of similarity between the compressed image and a compressed image associated with the verification target.

11. An authentication method comprising:
extracting a piece of vein information representing a vein from an image containing a vein of a finger, the extraction of the vein information comprising a plurality of intermediate processes before completing the extraction at a final process;
extracting a first piece of information from a first one of the intermediate processes of extracting the piece of vein information, the first piece of information representing a first outline of the finger; and
determining a verification target to be compared with the piece of vein information based on a degree of similarity between the first piece of information and a piece of extraction information extracted from the verification target,
wherein the first piece of information is extracted from a predetermined partial area of the image such that the first outline of the finger is a partial portion of a full outline in the image, and represents positions of first pixels of the first outline with respect to second pixels at an edge of the predetermined partial area of the image.

12. A registration device comprising:
a physical central processing unit (CPU);
a vein information extraction section, performed by the CPU, that extracts a piece of vein information representing a vein from an image containing a vein of a finger, the extraction of the vein information comprising a plurality of intermediate processes before completing the extraction at a final process;
a key information extraction section, performed by the CPU, that extracts a first piece of key information from a first one of the intermediate processes performed by the vein information extraction section to extract the piece of vein information, the first piece of key information representing a first outline of the finger; and
a registration section, performed by the CPU, that associates the piece of vein information with the first piece of key information and registers the piece of vein information and the first piece of key information in a storage section,
wherein the first piece of key information is extracted from a predetermined partial area of the image such that the first outline of the finger is a partial portion of a full outline in the image, and represents positions of first pixels of the first outline with respect to second pixels at an edge of the predetermined partial area of the image.

13. The registration device according to claim 12, wherein the first piece of key information represents a distance between one of the first pixels and one of the second pixels.

14. The registration device according to claim 12, wherein the key information extraction section extracts the first piece of key information when the vein information extraction section removes a noise from the image.

15. The registration device according to claim 12, wherein the key information extraction section further extracts a second piece of information from a second one of the intermediate processes, the second one of the intermediate processes being different from the first one of the intermediate processes.

16. The registration device according to claim 12, wherein the key information extraction section obtains from the vein information extraction section a binarization image obtained from a second one of the intermediate processes, and extracts the first piece of information so that the first piece of information comprises an amount of veins within the first outline of the finger in a predetermined partial area of the image.

17. The registration device according to claim 12, wherein the key information extraction obtains from the vein information extraction section a binarized image representing a vein portion whose vein width is constant and a background portion, and compresses the binarized image.

18. A registration method comprising:
extracting a piece of vein information representing a vein from an image containing a vein of a finger, the extraction of the vein information comprising a plurality of intermediate processes before completing the extraction at a final process;

extracting a piece of key information from one of the intermediate processes, the piece of key information representing a first outline of the finger; and associating the piece of vein information and the piece of key information and registering the piece of vein information and the piece of key information in a storage section, wherein the piece of key information is extracted from a predetermined partial area of the image such that the first outline of the finger is a partial portion of a full outline in the image, and represents positions of first pixels of the first outline with respect to second pixels at an edge of the predetermined partial area of the image.

* * * * *

UNITED STATES PATENT AND TRADEMARK OFFICE
CERTIFICATE OF CORRECTION

| | | |
|---|---|---|
| PATENT NO. | : 8,666,121 B2 | Page 1 of 1 |
| APPLICATION NO. | : 12/464494 | |
| DATED | : March 4, 2014 | |
| INVENTOR(S) | : Muquit et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this
Twenty-first Day of July, 2015

Michelle K. Lee
*Director of the United States Patent and Trademark Office*